(12) United States Patent
Sharma et al.

(10) Patent No.: US 11,714,842 B1
(45) Date of Patent: Aug. 1, 2023

(54) SYSTEM AND METHOD FOR SENSITIVE CONTENT ANALYSIS PRIORITIZATION BASED ON FILE METADATA

(71) Applicant: Egnyte, Inc., Mountain View, CA (US)

(72) Inventors: Shishir Sharma, Mountain View, CA (US); Amrit Jassal, Morgan Hill, CA (US); Sean H. Puttergill, Sunnyvale, CA (US); Willy Lanig Picard, Poznan (PL); Marcin Artur Zablocki, Poznan (PL)

(73) Assignee: Egnyte, Inc., Mountain View, CA (US)

( * ) Notice: Subject to any disclaimer, the term of this patent is extended or adjusted under 35 U.S.C. 154(b) by 571 days.

(21) Appl. No.: 16/862,482

(22) Filed: Apr. 29, 2020

Related U.S. Application Data

(60) Provisional application No. 62/840,623, filed on Apr. 30, 2019.

(51) Int. Cl.
*G06F 16/35* (2019.01)
*G06F 16/182* (2019.01)

(52) U.S. Cl.
CPC ............... *G06F 16/353* (2019.01); *G06F 16/183* (2019.01)

(58) Field of Classification Search
CPC ................ G06F 16/182; G06F 16/183
See application file for complete search history.

(56) References Cited

U.S. PATENT DOCUMENTS

| | | | | |
|---|---|---|---|---|
| 8,640,251 B1* | 1/2014 | Lee et al. | ............ | G06F 16/164 |
| | | | | 707/786 |
| 10,275,396 B1* | 4/2019 | Hart | ..................... | G06F 16/122 |
| 10,534,933 B1* | 1/2020 | Roundy et al. | ..... | G06F 21/6227 |
| 2012/0069406 A1* | 3/2012 | Furuichi et al. | ....... | G06Q 10/10 |
| | | | | 358/448 |
| 2017/0185799 A1* | 6/2017 | Zheng | ................ | G06F 16/9535 |
| 2020/0057864 A1* | 2/2020 | Parthasarathy | ... | G06F 16/24578 |

\* cited by examiner

*Primary Examiner* — Grace Park
(74) *Attorney, Agent, or Firm* — Larry E. Henneman, Jr.; Henneman & Associates, PLC

(57) ABSTRACT

Example systems and methods for efficient data governance are disclosed. Metadata associated with file objects is analyzed to estimate, for each file object, likelihood that the file object includes sensitive data. The estimates are used to prioritize the file objects for analysis of the file objects' content to determine the objects include data deemed to be of a sensitive nature. In cloud-based systems/methods the estimates are also used to prioritize the file objects for transfer from a remote file storage system to the cloud-based system for analysis of content. The disclosed systems and methods significantly reduce the time required to identify sensitive file content in a large number of file objects.

20 Claims, 12 Drawing Sheets

SYSTEM AND METHOD FOR SENSITIVE CONTENT ANALYSIS PRIORITIZATION BASED ON FILE METADATA

RELATED APPLICATIONS

This application claims the benefit of co-pending U.S. Provisional Pat. Application No. 62/840,623, filed on Apr. 30, 2019 by at least one common inventor, which is incorporated herein by reference in its entirety.

BACKGROUND OF THE INVENTION

Field of the Invention

This invention relates generally to cloud computing systems and, more particularly, to systems and methods for data governance in cloud computing systems. Even more particularly, this invention relates to identifying sensitive data within a cloud computing system to facilitate data governance.

Description of the Background Art

Cloud computing systems are well-known. Cloud computing systems utilize data networks to provide remote storage, access, and/or monitoring of data objects owned by cloud users. Cloud computing systems typically consist of a data storage component, such as a network-attached storage drive, for storing data and a web-server for providing remote access, monitoring, etc. Oftentimes, stored data contains sensitive content including, for example, personal data regarding individuals, confidential information of organizations, and/or information that is governed by some external regulation. Data containing sensitive content can/should be protected and/or monitored.

Data governance applications provide visibility into data, data access patterns, and modification events across various data sources. Some applications further include an ability to define and enforce access policies to ensure adequate protection of data objects. An important part of such systems is the ability to inspect unstructured content and analyze it using different techniques to find content matching patterns indicative of sensitive data. Such data may relate to privacy (e.g., addresses, phone numbers, email addresses, etc.), intellectual property, or various compliances for health, financial, and/or other verticals.

Providing continuous coverage on a variety of data sources requires continued monitoring of these sources. This is typically done by capturing the initial state of the data source and analyzing it, then looking for incremental updates to the source and analyzing them. Current governance applications tasked with monitoring large amounts of data are not able to efficiently process and analyze data from these sources, which costs excess time and resources that could otherwise be used more effectively. Thus, current governance applications potentially leave files with sensitive content at risk.

SUMMARY

The present invention overcomes the problems associated with the prior art by providing a system and method for using file metadata to estimate the sensitivity of data objects stored on one or more file storage systems. In either a local file system or a remote cloud computing system, the invention facilitates efficient processing and analysis of files potentially containing sensitive content, by providing an estimate of the sensitivity of the files and prioritizing them based on the estimate. An estimate of the sensitivity of each file can be done by analyzing the metadata of the file, with files being sorted, based at least in part on the sensitivity estimates. The contents of the files are then provided to the governance program in a particular order, based at least in part on the sensitivity estimates and subsequent sorting. The present invention provides the advantage of efficiently utilizing computational resources by prioritizing the analysis of sensitive files based on an initial sensitivity estimate performed using only the files' metadata. The advantages are even more significant in a remote cloud computing system, because the provision of the file system objects for analysis requires the transfer of the files system object from a remote file storage system, so that the time required for the initial analysis of the file system objects depends on the available file transfer bandwidth between the remote and local systems.

Example methods for performing sensitive content analysis on a plurality of file system objects are disclosed. One example method includes obtaining first metadata and second metadata, analyzing the first metadata to generate a first estimate value, analyzing the second metadata to generate a second estimate value, prioritizing a first object and a second object based at least in part on the first estimate value and the second estimate value, and analyzing content of the first object to determine whether the first object includes sensitive content prior to analyzing content of the second object to determine whether the second object includes sensitive content. The first metadata corresponds to at least the first object of a plurality of file system objects, and the second metadata corresponds to at least the second object of the plurality of file system objects. The first estimate value is indicative of a likelihood that the first object includes sensitive content, and the second estimate value being indicative of a likelihood that the second object includes sensitive content.

Another example method for performing, in a data governance system, sensitive content analysis on a plurality of file system objects of a geographically remote file storage system associated with a particular client is also disclosed. The example method includes establishing a wide-area network connection with the remote file storage system and receiving, via the wide-area network connection, first metadata and second metadata. The first metadata corresponds to at least a first object of the plurality of file system objects of the remote file storage system, and the second metadata corresponds to at least a second object of the plurality of file system objects of the remote file storage system. The example method additionally includes analyzing the first metadata to generate a first estimate value based at least in part on the first metadata and analyzing the second metadata to generate a second estimate value based at least in part on the second metadata. The first estimate value is indicative of a likelihood that the first object includes sensitive content, and, the second estimate value is indicative of a likelihood that the second object includes sensitive content. The example method additionally includes prioritizing the first object and the second object, based at least in part on the first estimate value and the second estimate value, retrieving the first object prior to retrieving the second object based at least in part on the results of the prioritizing, and analyzing first content of the first object to determine whether the first object includes sensitive content prior to analyzing second content of the second object to determine whether the second object includes sensitive content. Optionally, the first metadata can be indicative of at least a first name and a first path of the first object, and the second metadata can indicative of at least a second name and a second path of the second object.

In a more particular example method, the step of analyzing the first metadata includes extracting a first set of features from the first metadata, the first set of features having been determined to be indicative of the likelihood that the first object includes sensitive content. The step of analyzing the first metadata includes analyzing the first set of features of the first metadata to generate the first estimate value. Similarly, the step of analyzing the second metadata includes extracting a second set of features from the second metadata, the second set of features having been determined to be indicative of the likelihood that the second object includes sensitive content, and the step of analyzing the second metadata includes analyzing the second set of features of the second metadata to generate the second estimate value.

A particular example of an intelligent method additionally includes obtaining a first set of training metadata corresponding to a first set of file system objects and processing the first set of training metadata to extract a first set of training features from the first set of training metadata. Each object of the first set of file system objects has a known sensitivity corresponding to an amount of sensitive data known to be present in each respective file system object. The example intelligent method additionally includes analyzing the first set of training features to determine a relationship between the first set of training features and the known sensitivities of the first set of file system objects. In the example intelligent method, the step of analyzing the first set of features includes utilizing the relationship between the first set of training features and the known sensitivities to generate the first estimate value, and the step of analyzing the second set of features includes utilizing the relationship between the first set of training features and the known sensitivities to generate the second estimate value.

In the example intelligent method, the step of extracting the first set of features from the first metadata can include representing the features as a first set of values, each value of the first set of values being indicative of one or more of the features extracted from the metadata. In addition, the step of processing the first set of training metadata can include representing the first set of training features as a first set of training values, each training value of the first set of training values being indicative of one or more of the training features of the first set of training features. Then, the step of analyzing the first set of training features can include analyzing the first set of training values to determine the relationship, and the step of analyzing the first set of features of the first metadata can include analyzing the first set of values in view of the relationship.

In the example methods, the step of extracting the first set of features from the first metadata can include determining a number of characters included in a first name or a first path of the first object. The step of extracting the first set of features from the first metadata can also include determining whether a first name or a first path of the first object contains a year or a date. As another option, the step of extracting the first set of features from the first metadata can include determining a file extension type of the first object. As yet another option, the step of extracting the first set of features from the first metadata can include determining whether any of a predefined list of non-alphanumeric symbols are included in a first name or a first path of the first object. The step of extracting a first set of features from the first metadata can also include determining whether any words of a predefined list of words indicative of sensitive content are included in the first metadata.

As yet another option, the step of extracting a first set of features from the first metadata can include processing the first metadata to extract n-grams from a name or a path of the first object. The n-grams can each include a predetermined number (n) of consecutive characters from the first name or the first path. The predetermined number (n) can be the same for each of the n-grams. Then, the n-grams can be filtered to remove a first portion of the n-grams that occur most frequently within the metadata, and the n-grams can be filtered to remove a second portion of the n-grams that occur least frequently within the metadata. In a particular example method, the predetermined number of consecutive characters is three.

In a particular example method, the step of analyzing the first metadata includes generating the first estimate value as a particular value within a range of possible values. A first extreme of the range of possible values can indicate that the first object definitely contains sensitive information, and a second extreme of the range of possible values can indicate that the first object definitely does not contain sensitive information. Then, the step of prioritizing the first object and the second object can include prioritizing the first object above the second object, when the first estimate value is nearer the first extreme than the second estimate value.

Example data governance systems are also disclosed. One example data governance system includes at least one hardware processor, memory, a metadata service, a sensitive content prediction service, and a content classification service. The memory stores data and code, and the code includes a set of predefined instructions configured to cause the hardware processor to perform a corresponding set of operations when executed by the hardware processor. The metadata service includes a first subset of the set of predefined instructions configured to receive first metadata and second metadata. The first metadata corresponds to at least a first object of a plurality file system objects, and the second metadata correspond to at least a second object of the plurality of file system objects. The sensitive content prediction service includes a second subset of the set of predefined instructions configured to analyze the first metadata to generate a first estimate value based at least in part on the first metadata. The first estimate value is indicative of a likelihood that the first object includes sensitive content. Similarly, the second metadata is also analyzed to generate a second estimate value based at least in part on the second metadata. The second estimate value is indicative of a likelihood that the second object includes sensitive content. The sensitive content prediction service also includes a second subset of the set of predefined instructions configured to prioritize the first object and the second object, based at least in part on the first estimate and the second estimate. The content classification service includes a third subset of the set of predefined instructions configured to analyze first content of the first object to determine whether the first object includes sensitive content prior to analyzing second content of the second object to determine whether the second object includes sensitive content.

An example data governance system for performing sensitive content analysis on a plurality of file system objects of a geographically remote file storage system associated with a particular client is also disclosed. The example data governance system includes at least one hardware processor, memory storing data code, a network interface, a metadata service, a sensitive content prediction service, a content service, and a content classification service. The code includes a set of predefined instructions configured to cause the hardware processor to perform a corresponding set of operations when executed by the hardware processor. The network interface is electrically connected to establish a wide-area network connection with the remote file storage system. The metadata service includes a first subset of the set of predefined instructions configured to receive, via the wide-area network connection, first metadata and second metadata. The first metadata corresponds to at least a first object of the plurality file system objects of the remote file storage system, and the second metadata corresponding to at least a second object of the plurality of file system objects of the remote file storage system. The sensitive content prediction service includes a second subset of the set of predefined instructions configured to analyze the first metadata to generate a first estimate value based at least in part on the first metadata. The first estimate value is indicative of a likelihood that the first object includes sensitive content. The sensitive content prediction service also analyzes the second metadata to generate a second estimate value based at least in part on the second metadata. The second estimate value is indicative of a likelihood that the second object includes sensitive content. The sensitive content prediction service also includes a third subset of the set of predefined instructions configured to prioritize the first object and the second object, based at least in part on the first estimate and the second estimate. The content service includes a fourth subset of the set of predefined instructions configured to retrieve the first object prior to retrieving the second object based at least in part on the prioritization. The content classification service includes a fifth subset of the set of predefined instructions configured to analyze first content of the first object to determine whether the first object includes sensitive content prior to analyzing second content of the second object to determine whether the second object includes sensitive content. In a particular example system, the first metadata can indicative of at least a first path and a first name of the first object, and the second metadata can be indicative of at least a second path and a second name of the second object.

In a particular example system, the second subset of the set of predefined instructions can be additionally configured to extract a first set of features from the first metadata, the first set of features having been previously determined to be indicative of the likelihood that the first object includes sensitive content. The second subset of the set of predefined instructions can be further configured to analyze the first set of features of the first metadata to generate the first estimate value. The second subset of the set of predefined instructions can be further configured to extract a second set of features from the second metadata, the second set of features having been previously determined to be indicative of the likelihood that the second object includes sensitive content. The second subset of the set of predefined instructions can be further configured to analyze the second set of features of the second metadata to generate the second estimate value.

An example intelligent system additionally includes a training service. The training service can include a sixth subset of the set of predefined instructions configured to obtain a first set of training metadata corresponding to a first set of file system objects. Each object of the first set of file system objects has a known sensitivity corresponding to an amount of sensitive data known to be present in each respective file system object. The training service can also include a seventh subset of the set of predefined instructions configured to process the first set of training metadata to extract a first set of training features from the first set of training metadata. The training service can also include an eighth subset of the set of predefined instructions configured to analyze the first set of training features to determine a relationship between the first set of training features and the known sensitivities of the first set of file system objects. In the example intelligent system, the second subset of the set of predefined instructions can be additionally configured to utilize the relationship between the first set of training features and the known sensitivities to generate the first estimate value, and the second subset of the set of predefined instructions can be additionally configured to utilize the relationship between the first set of training features and the known sensitivities to generate the second estimate value.

In the example intelligent system, the step of extracting a first set of features from the first metadata can include representing the features as a first set of values. Each value of the first set of values can be indicative of one or more of the features extracted from the first metadata. The step of processing the first set of training metadata can include representing the first set of training features as a first set of training values. Each training value of the first set of training values can be indicative of one or more of the training features of the first set of training features. The step of analyzing the first set of training features can include analyzing the first set of training values to determine the relationship, and the step of analyzing the first set of features of the metadata can include analyzing the first set of values in view of the relationship.

In the example systems, the second subset of the set of predefined instructions (e.g., sensitive content prediction service) can be further configured to determine a number of characters included in a first name or a first path of the first object. The second subset of the set of predefined instructions can also be configured to determine whether a first name or a first path of the first object contains a year or a date. As another option, the second subset of the set of predefined instructions can also be configured to determine a file extension type of the first object. As yet another option, the second subset of the set of predefined instructions can also be configured to determine whether any of a predefined list of non-alphanumeric symbols are included in a first name or a first path of the first object. The second subset of the set of predefined instructions can also be configured to determine whether any of a predefined list of words indicative of sensitive content are included in the metadata corresponding to the first object.

As another option, the second subset of the set of predefined instructions can be additionally configured to process the first metadata to extract n-grams from a name or a pathway of the first object. The n-grams can each include a predetermined number (n) of consecutive characters from the first name or the first path. The predetermined number can be the same for each of the n-grams. The n-grams can then be filtered to remove a first portion of the n-grams that occur most frequently within the metadata, and the n-grams can also be filtered to remove a second portion of the n-grams that occur least frequently within the metadata. In a particular example system the predetermined number of consecutive characters is three.

In the example systems, the second subset of the set of predefined instructions can be additionally configured to generate the first estimate value as a particular value within a range of possible values. A first extreme of the range of possible values can indicate that the first object definitely contains sensitive information, and a second extreme of the range of possible values can indicate the first object definitely does not contain sensitive information. The third subset of the set of predefined instructions can also be configured to prioritize the first object above the second object, when the first estimate value is nearer the first extreme than the second estimate value.

An example non-transitory, computer-readable medium includes instructions for causing a data governance system to establish a wide-area network connection with a geographically remote file storage system associated with a particular client of a plurality of unrelated clients of the data governance system. The instructions also cause the data governance system to receive, via the wide-area network connection, first metadata and second metadata. The first metadata can correspond to at least a first object of the plurality of file system objects of the remote file storage system, and the second metadata can correspond to at least a second object of the plurality of file system objects of the remote file storage system. The instructions also cause the data governance system to analyze the first metadata to generate a first estimate value based at least in part on the first metadata, the first estimate value being indicative of a likelihood that the first object includes sensitive content. The instructions also cause the data governance system to analyze the second metadata to generate a second estimate value based at least in part on the second metadata, the second estimate value being indicative of a likelihood that the second object includes sensitive content. The instructions also cause the data governance system to prioritize the first object and the second object, based at least in part on the first estimate value and the second estimate value. The instructions also cause the data governance system to retrieve the first object prior to receiving the second object based at least in part on results of the prioritization, and to analyze first content of the first object to determine whether the first object includes sensitive content prior to analyzing the second object to determine whether the second object includes sensitive content.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing systems and methods for estimating the sensitivity of the contents of a file, based on the file's metadata. In the following description, numerous specific details are set forth (e.g., particular software modules, hardware configurations, etc.) in order to provide a thorough understanding of the invention. Those skilled in the art will recognize, however, that the invention may be practiced apart from these specific details. In other instances, details of well-known cloud-computing practices (e.g., networking, data storage, routine optimization, etc.) and components have been omitted, so as not to unnecessarily obscure the present invention.

Figure 1:
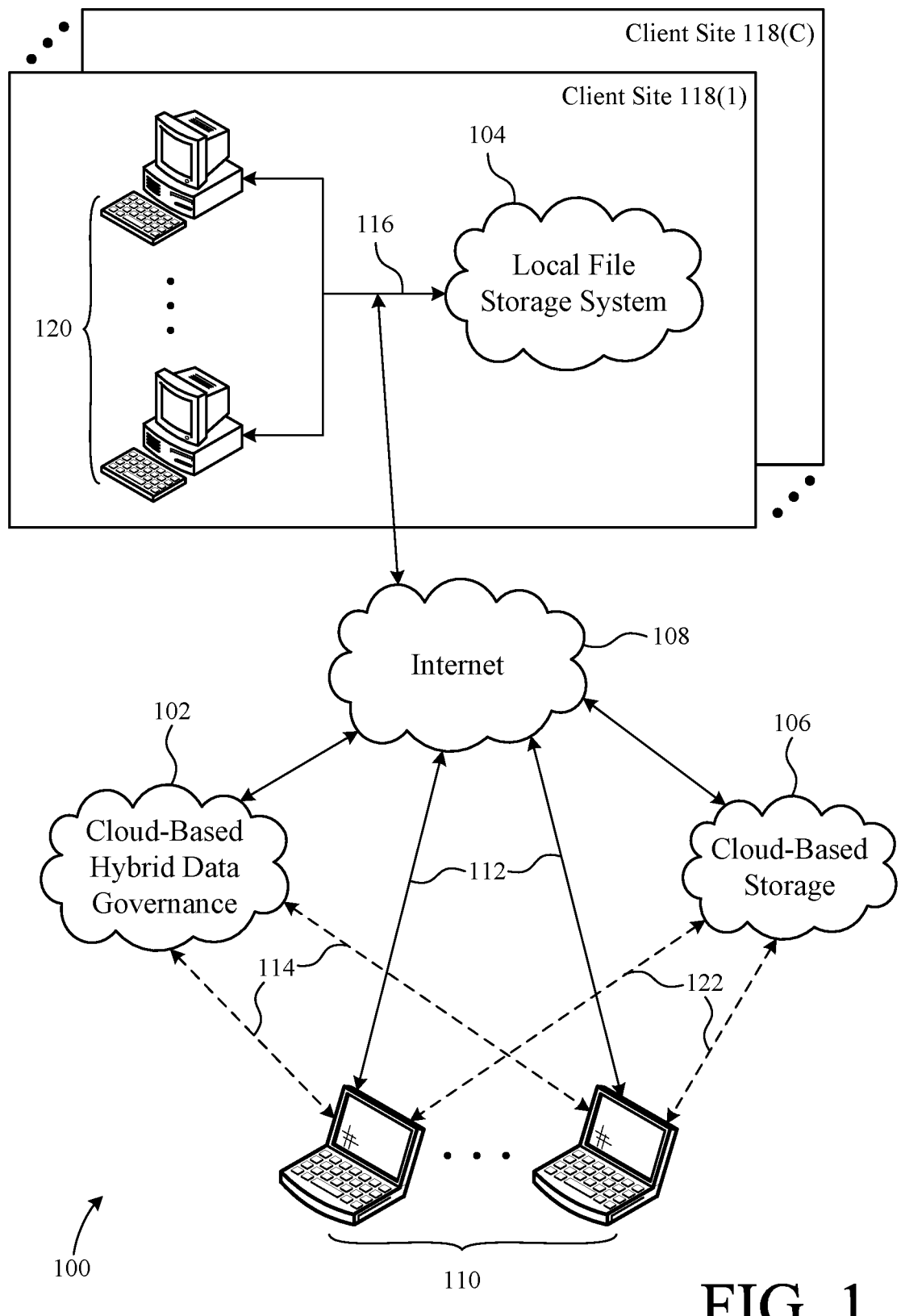
FIG. 1 is a diagram showing an example cloud-based data governance system.

FIG. 1 is a diagram showing an example cloud computing system 100 that includes a cloud-based, hybrid data governance system 102, a local file storage system 104, and a cloud-based storage server 106, all interconnected via the Internet 108. Data governance system 102 provides visibility to data access and modification events occurring on local file storage system 104 and data storage server 106. Data governance system 102 can be accessed by remote users logged onto remote clients 110 via Internet connections 112 or alternative connections (e.g. dial-up connections, web-socket connections, etc.) 114. Remote clients 110 are machines (e.g. laptops, smart phones, etc.) with sufficient credentials to view data indicative of file system operations that are executed on data objects stored on local file storage system 104 and storage server 106. Remote users can also utilize remote clients 110 to view and/or change governance policies stored on data governance system 102, provided they have sufficient credentials to do so.

Local file storage system 104 can be hosted, for example, on a network-attached storage (NAS) device (FIG. 2) or any other type of file storage system attached to a local network 116 located at a client site 118(1). Additional client sites 118 (2-C) host additional local file storage systems. Each of client sites 118(1-C) can be associated with the same or different cloud clients, because data governance system 102 is capable of providing governance services to any number of clients (related or unrelated) at any number of different locations, and is scalable in the event that additional clients and/or locations are added. This type of cloud system is sometimes referred to as a multi-tenant service. Local users utilize local clients 120 to access and/or modify data objects stored on local file storage system 104 and also, with proper credentials, view and/or change governance policies stored on data governance system 102.

In the example embodiment, at least a portion of local file storage system 104 is bidirectionally synchronized with storage server 106. In alternate embodiments, local file storage system 104 and storage server 106 can operate completely independently of one another. Storage server 106 is a cloud-based application for storing and accessing remote data objects. Remote clients 110 can access storage server 106 via Internet connections 112 or alternative connections 122, in order to upload, download, view, or update data objects stored thereon. Optionally, local clients 120 can also access storage server 106 via local network 116 and Internet 108.

In order to provide secure governance of the data stored on local file storage system 104 and cloud-based storage 106, data governance system 102 should have information indicative of the sensitivity of files stored thereon. In the example embodiment, data governance system 102 estimates the sensitivity of individual files stored on local file storage system 104 and cloud-based storage 106 utilizing metadata corresponding to those files, but without analyzing the content of the files. A high sensitivity estimate value indicates a high probability that a particular file object includes sensitive content and/or that the particular type of sensitive content is relatively more sensitive than other types of sensitive content. The sensitivity estimates are then used to prioritize the files for download and subsequent sensitivity analysis of the file content itself. Files that have a high sensitivity estimate are prioritized for download sooner than files having a low sensitivity estimate. In this way, files that are more likely to contain sensitive data are analyzed first, so that sensitive data can be identified earlier and without using resources unnecessarily. This aspect of cloud computing system 100 will be discussed in greater detail throughout the following disclosure.

Figure 2:
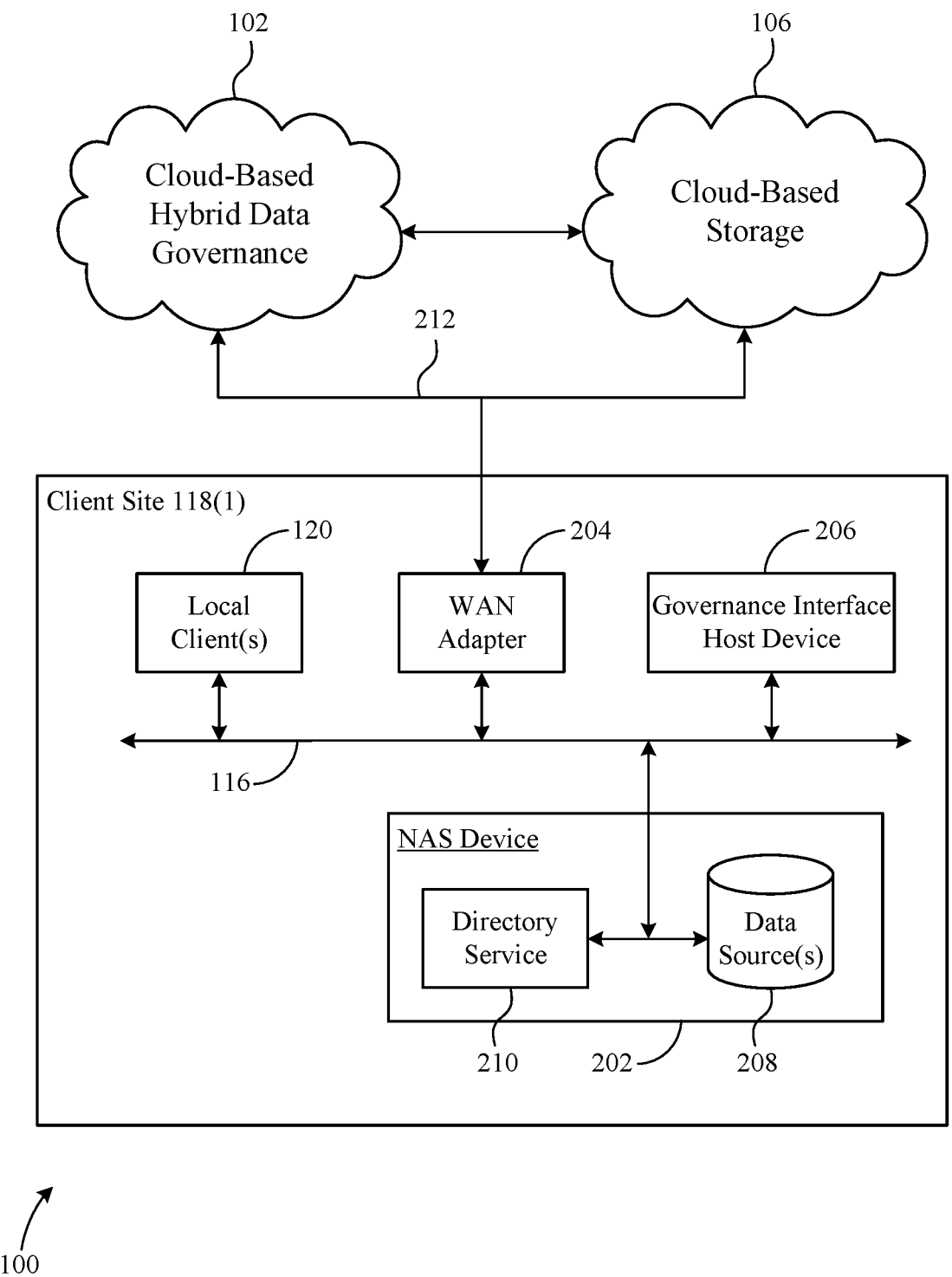
FIG. 2 is a diagram showing the client site of FIG. 1 in greater detail.

FIG. 2 is a block diagram showing communication between various components of cloud computing system 100, including client site 118(1), which is shown in greater detail. Client site 118(1) includes a network-attached storage (NAS) device 202 (or any other suitable data storage device(s)), a WAN adapter 204, a governance interface host device 206, and local clients 120, all interconnected via local network 116. NAS device 202 is a storage device (or multiple storage devices) connected to local network 116 and accessible by other components connected to local network 116. NAS device 202 hosts data source(s) 208 and a directory service 210, which could optionally run on a separate, dedicated server. Data sources 208 include file system objects (e.g. files, metadata, applications, etc.) constituting a local file system that can be accessed by local clients 120 for viewing, editing, utilization, etc. Directory service 210 includes user permissions and lookup tables to allow local clients 120 with sufficient credentials to locate and access available data objects included in data sources 208. WAN adapter 204 is a network device that provides a connection to a wide-area network, which, in this example, is the Internet 108 (omitted from FIG. 2 for clarity). Components connected to local network 116 can access data governance system 102 and storage server 106 via an Internet connection 212 provided by WAN adapter 204. Local clients 120 can utilize Internet connection 212 to upload and/or download data objects from storage server 106.

Governance interface host device 206 is a device that hosts a software-based governance interface. In the example embodiment, governance interface host device 206 is a server running software for accessing metadata and/or file content and providing them to cloud-based data governance system 102. The software running on governance interface host device 206 is configured and operative to receive and analyze messages and requests from cloud-based data governance system 102 and provide metadata, file contents, access and modification events, etc. to data governance system 102. Communications between governance interface host device 206 and data governance system 102 facilitate a significant portion of the data governance functionality provided by data governance system 102.

Figure 3:
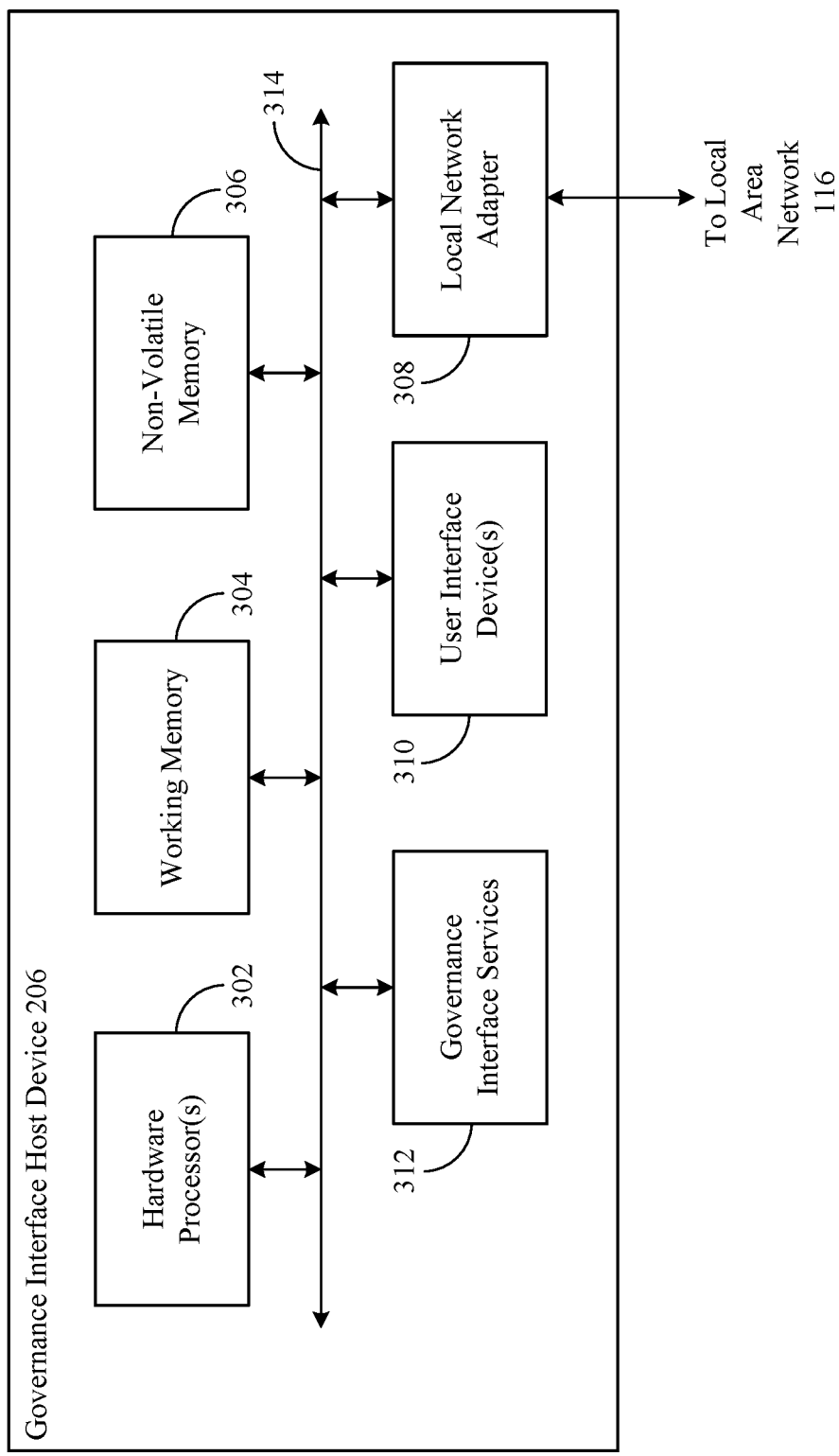
FIG. 3 is a diagram showing a governance interface host device of FIG. 2 in greater detail.

FIG. 3 is a block diagram showing governance interface host device 206 in greater detail. Host device 206 can be a server-type device, hosting hardware, software, firmware, or any combination thereof, configured to provide a system-specific interface between local file storage system 104 and data governance system 102. In this example, host device 206 includes a hardware processor 302, working memory 304, non-volatile memory 306, a local network adapter 308, governance interface services 310, and a user interface device(s) 312, all interconnected via a system bus 314. Hardware processor 302 is electrically connected to execute data and code stored in working memory 304, thereby providing functionality to host device 206. Working memory 304 is random access memory (RAM) storing data and code for direct use by hardware processor 302. This data and code includes software, network addresses, memory addresses, etc. that are necessary for performing the intended functions of host device 206. Non-volatile memory 306 is persistent storage that stores data and software that is loaded into working memory 304 to be executed by hardware processor 302. Non-volatile memory 306 includes at least a set of predefined instructions (e.g., native code or machine code) configured to cause hardware processor 302 to perform a corresponding set of operations when executed. The functionality of host device 206 is achieved by configuring various subsets of these predefined instructions (e.g., software modules/programs) to accomplish corresponding tasks. Local network adapter 308 is electrically connected between local area network 116 and system bus 314 to facilitate communication between host device 206 and other components of local area network 116, particularly WAN adapter 204 and, consequently, data governance system 102. User interface device 310 is an interface for allowing network administrators to access the software and/or components of host device 206 in order to upgrade components, provide software updates, configure settings, etc.

Governance interface services 312 can be software, hardware, firmware, or any combination thereof configured to coordinate interactions between host device 206 and data governance system 102. Governance interface services 312 provide such functionality as, by way of non-limiting example, capturing file system access and modification events, capturing metadata and content, providing events, metadata, and content to data governance system 102, receiving control messages from data governance system 102, and/or executing instructions received within the control messages. These functions of governance interface services 312 facilitate the broader data governance services of data governance system 102 by providing data governance system 102 with information indicative of the data stored on local file storage system 104 as well as access and the ability to modify that data.

Figure 4:
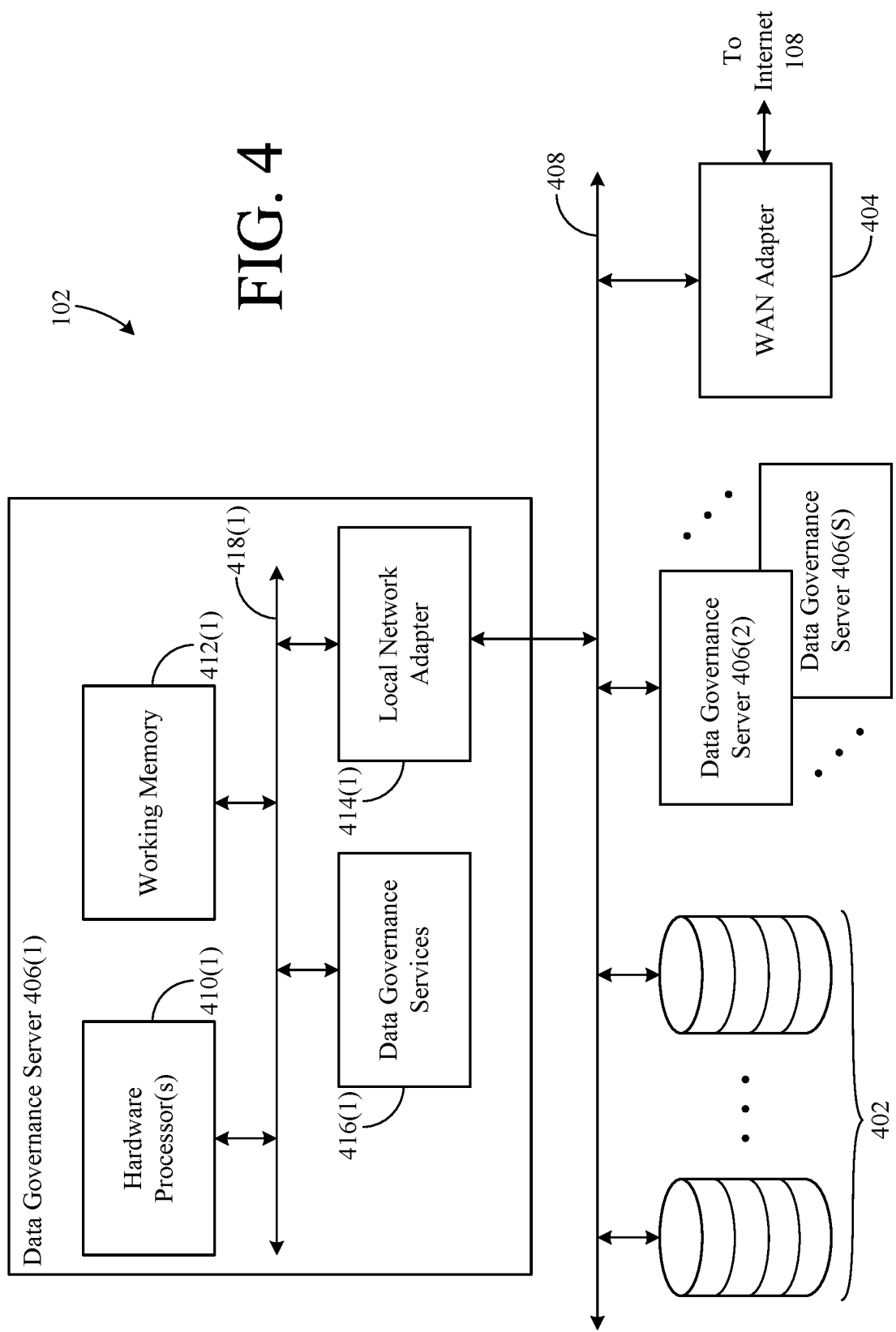
FIG. 4 is a diagram showing the cloud-based hybrid data governance server of FIG. 1 in greater detail.

FIG. 4 is a block diagram showing data governance system 102 in greater detail. Data governance system 102 is a cloud-based computer system including multi-tenant data storage devices 402, a WAN adapter 404, and data governance servers 406(1-S), all interconnected via a local network 408. As a multi-tenant, cloud-based system, data governance system 102 can provide data governance services to a plurality of unrelated entities/enterprises, while maintaining the security and privacy of each entity's data/information with respect to the other unrelated entities using data governance system 102 and unrelated entities not authorized to use data governance system 102. Storage devices 402 are network attached storage devices for storing data associated with the multiple different cloud clients. Storage devices 402 can also provide the non-volatile data storage utilized by the other components of data governance system 102. WAN adapter 404 is a network adapter for establishing a connection to the Internet 108. Elements of data governance system 102 utilize WAN adapter 404 to communicate with remote systems, such as local file storage system 104 (e.g., governance interface host device 206) and storage server 106.

Data governance servers 406 provide data governance services for local file storage systems and cloud-based storage servers associated with the various cloud clients. In this non-limiting example, data governance server 406(1) provides data governance services for local file storage system 104 (remotely located at client site 118(1)) and storage server 106. Data governance server 406(1) includes one or more hardware processors 410(1), working memory 312(1), a local network adapter 414(1), and a data governance services module 416(1), all interconnected via a system bus 418(1). Hardware processors 410(1) execute code transferred into working memory 412(1) from, for example, storage devices 402 to impart functionality to various components of data governance server 406(1). Like hardware processor 302, the executed code includes a set of predefined instructions for causing hardware processors 410(1) to perform a corresponding set of operations when executed. In most instances the two sets of predefined instructions will be different, but they need not be. Working memory 412(1) can also cache frequently used code, such as network locations of storage devices 402, to be quickly accessed by the various components of data governance server 402(1). Local network adapter 414(1) provides a network connection between data governance server 406(1) and local network 408 and, therefore, WAN adapter 404, which provides a connection to the Internet 108. Data governance services 416(1) are various software services, running within working memory 412(1), for collecting and analyzing metadata, file contents, and/or events that are received from governance interface host device 206. Data governance services 416(1) perform data analytics on file system metadata, file contents, and/or events received from governance interface host device 206.

Although only data governance server 406(1) is shown in detail, it should be understood that data governance server 406(1) is substantially similar to data governance servers 406(2-S), except that any of data governance servers 406 can correspond to different, unrelated cloud clients and, therefore, can be configured differently to utilize different data, settings, applications, network connections, etc.

Figure 5A:
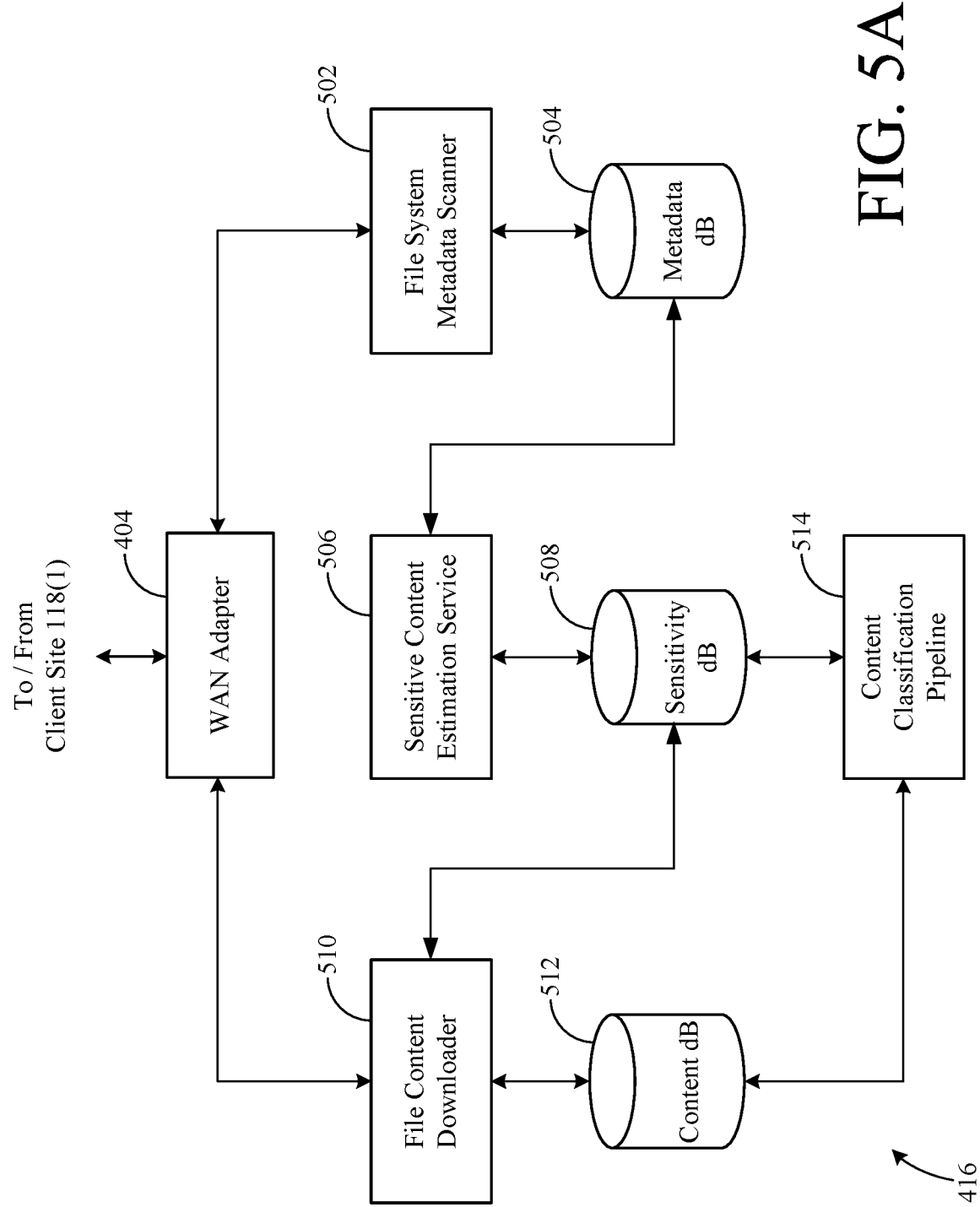
FIG. 5A is a diagram showing elements of the data governance services of FIG. 4 in greater detail.

FIG. 5A is a diagram showing functional elements of data governance services 416 in greater detail. In particular, the elements shown provide the functionality for classifying file system contents. In this particular example, the functional aspects are embodied as software modules running in data governance services 416, but can be distributed across other modules or even other machines. Alternatively, these functional aspects could be provided by one or more of cloud-based hybrid data governance 102, local file storage system 104, and/or cloud-based storage 106. The functional components can include software, hardware, firmware, or any combination thereof.

A disadvantage of known data governance solutions is that the transfer of files from a remote data source is a lengthy process over a wide-area connection. Indeed, the transfer of the files from the client to the cloud can take an extremely long time, especially in enterprise environments having large amounts of data. The time required to transfer all the files of a large enterprise consumer can take up to hours or days. As a consequence, the speed of the sensitive content classification process is limited in known systems by the time required to transfer the files from the consumer to the data governance servers. However, the transfer of file metadata corresponding the files is a much faster process, because the size of metadata is much smaller than the size of the files themselves. Therefore, the present invention provides an important advantage, because information about the sensitivity of files can be estimated even before the files themselves are transferred for analysis of their actual content.

Additionally, in known cloud systems, the order of the files transferred from the consumer to the data governance servers is not based on any prior knowledge or prediction about the existence of sensitive content in the transferred files. As a consequence, there is no guarantee that the files containing sensitive contents are analyzed first. In the worst case, the files containing sensitive contents might be among the very last ones to be transferred, and therefore the last ones to be analyzed, which, as mentioned above, could be several days after the process is started.

A great advantage is provided by reordering the files, such that the files estimated/expected to contain sensitive content are the first to be transferred. The magnitude of the advantage depends, at least in part, on the correctness/accuracy of the predictions about the existence of sensitive content in a given file. Therefore, the current invention provides an adaptable, machine-learning platform for generating accurate estimates of the sensitivity of a file. This machine-learning platform can be selectively tailored to particular clients, environments, data types, etc.

A sensitive content classification estimation process is provided that is based only on the file metadata from the source (e.g., file name, size, etc.), pre-fetched before file content retrieval and without any processing of the content of the files. The sensitive content classification estimation process can generate a sensitivity score for each file. A higher sensitivity score/value for a given file, indicates a higher confidence/probability that the file includes sensitive content. Thereafter, files are sorted by the associated sensitivity score. The sorted list of files is then used to generate a file transfer priority queue, leading to first transferring files that are expected to contain sensitive content.

Example embodiments improve upon current systems in several ways. One improvement is a reduction in the time from file submission to classification (e.g., sensitive or not), because the time required to download the metadata is smaller than the time needed to download the entire file. Another improvement is a reduction in the need for in depth analysis of the file content to classify the file as sensitive or not. The only elements taken into account to classify the files are metadata. This element can be particularly important for files whose content is not available (such as classified or confidential documents). Yet another improvement is the provision of a score between zero and one that reflects the confidence in the existence of sensitive content in the file, instead of a binary classification (sensitive or not). This "confidence score" can be used as a threshold for classifying a given file as sensitive or not (e.g., files with a score of 0.2 or higher are classified as sensitive).

FIG. 5A illustrates a process by which file system contents are classified and provided to cloud-based hybrid data governance 102. First, a file system metadata scanner 502 retrieves metadata corresponding to file system objects from a source system (e.g. local file storage system 104) and stores the metadata in a file system metadata database 504. A sensitive content estimation service 506 accesses the metadata saved on database 504 and utilizes it to generate estimates of the sensitivity of corresponding file system objects. These estimates are then saved in a sensitivity database 508 for use by other elements of data governance services 416. The process of estimating the sensitivity of file system objects based on the corresponding metadata will be discussed in greater detail with reference to the remaining figures.

Once the sensitivities of the data objects are estimated, the file contents are downloaded for a more accurate determination based on the file content itself. A file content downloader 510 accesses the sensitivity estimates in sensitivity database 508 and prioritizes downloading the content based on the estimates. In particular, the files that are estimated to be more sensitive (or more likely to contain sensitive data) are downloaded from local file storage system 104 before files that are less likely to contain sensitive data. File content downloader 510 provides a request to local file storage system 104 via WAN adapter 404 and receives the file content in response. The file content is stored in a content database 512, which is accessed by a content classification pipeline 514 for further analysis. In particular, content classification pipeline 514 makes a determination of whether the content includes sensitive data, the degree of sensitivity, value of the content, or any other attribute(s) that cannot be discerned from the metadata alone. In general, the determination is made by matching the file contents against a set of content patterns (e.g., patterns indicative of bank accounts, personal data, trade secrets, etc.). Information indicative of these determinations is stored in sensitivity database 508 alongside the estimates. The determinations are utilized by data governance system 102 to inform a variety of data governance policies, systems, processes, etc., which are not discussed in detail in this disclosure.

In the case that a large number of files are to be analyzed, it is more efficient to split the files into batches (i.e., each batch includes N files). For each batch, an empty result batch is created. For each file in the batch the sensitivity estimate is computed and the file and sensitivity estimate are added to the result batch. As more estimates are added to the result batch, they are sorted from most sensitive to least sensitive. After processing every file in the batch, it is returned as a sorted batch. The sorted batch can be provided directly to file content downloader with the sensitivity estimates being saved to sensitivity database 508 as desired (e.g., at the same time, directly after, during content download, etc.).

It is not necessary, or even likely, that all of the files for one batch are transferred to cloud-based data governance system 102 before the files of a next batch are transferred. By way of non-limiting example, if files of a later batch are processed before the files of an earlier batch are transferred, then files of the later batch having a higher sensitivity estimate value can be transferred before files of the earlier batch having a relatively lower sensitivity estimate value.

Because the file content comprises much more data than the file metadata, it is much more efficient from both a time perspective and a bandwidth perspective to download the metadata first, then download the content based on the evaluation of the metadata. The inventors have found that the sensitivity of file content can be reliably estimated from the corresponding metadata. These predictions then allow the system to utilize time and other resources analyzing the content most likely to contain sensitive data, rather than randomly downloading and analyzing content that is unlikely to contain sensitive data. Thus, the present invention provides significant advantages from a security perspective, because sensitive files are identified sooner.

Figure 5B:
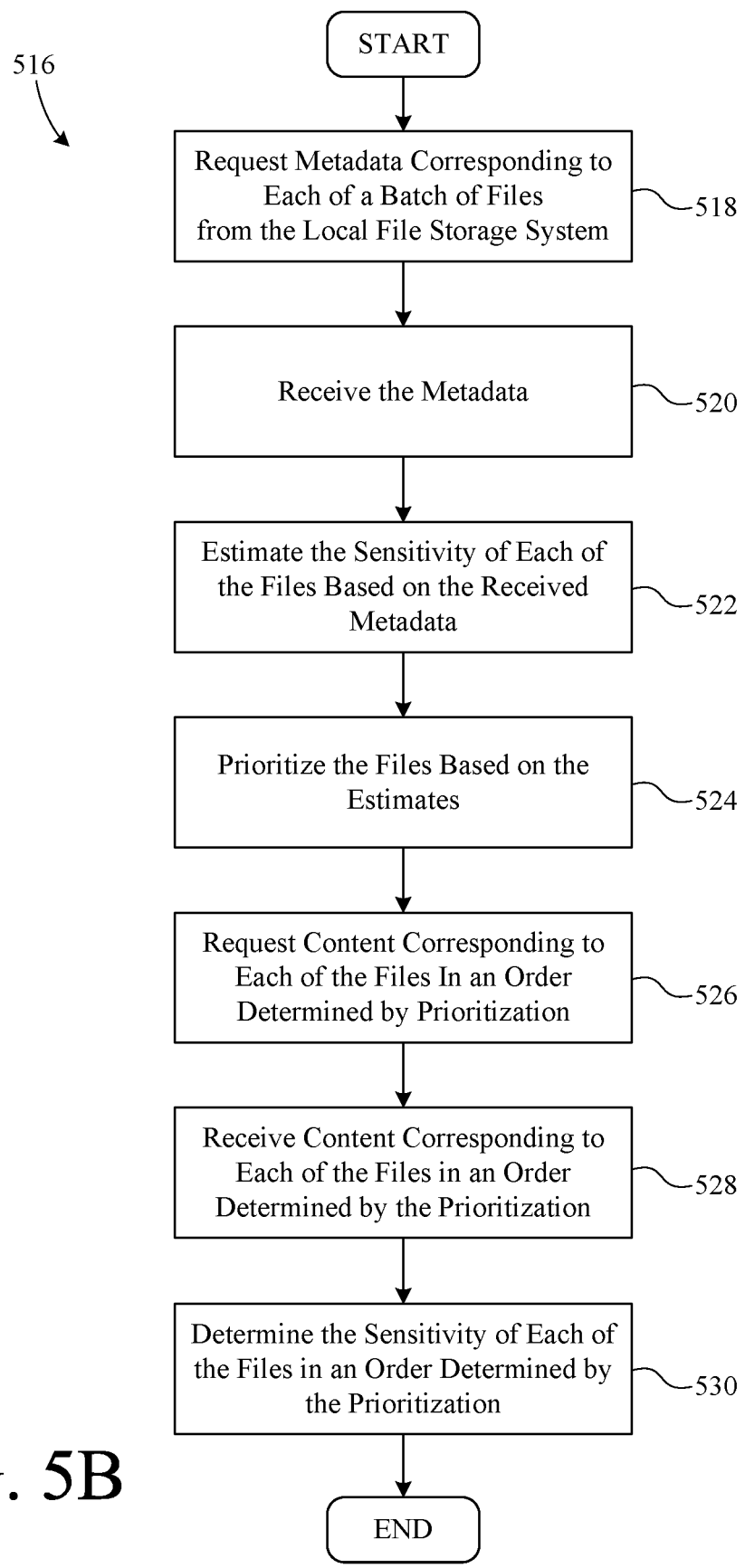
FIG. 5B is a flow chart summarizing an example method performed by the elements of FIG. 5A.

FIG. 5B is a flowchart summarizing an example method 516, which can be carried out by the elements shown in FIG. 5A. In a first step 518, metadata corresponding to each file of a batch of files is requested from local file storage system 104. The batch includes a predetermined number of files from a list of files submitted for analysis by data governance system 102. In a second step 520, the metadata is received via file system metadata scanner 502. Next, in a third step 522, the sensitivity of each of the files is estimated by sensitive content estimation service based on the received metadata. Then, in a fourth step 524 the files are prioritized by file content downloader 510 based on the estimates. In a fifth step 526, content corresponding to each of the prioritized files is requested by file content downloader 510 based on the prioritization. Next, in a sixth step 528, the content corresponding to each file is received in the order determined by the prioritization. Finally, in a seventh step 530, the sensitivity of each file is determined by content classification pipeline 514 in the order determined by the prioritization. It should be noted that, although method 516 is described with reference to the elements of FIG. 5A, these particular elements are not necessary for performing method 516, and method 516 can be performed in systems with different organization and/or architecture.

Figure 6A:
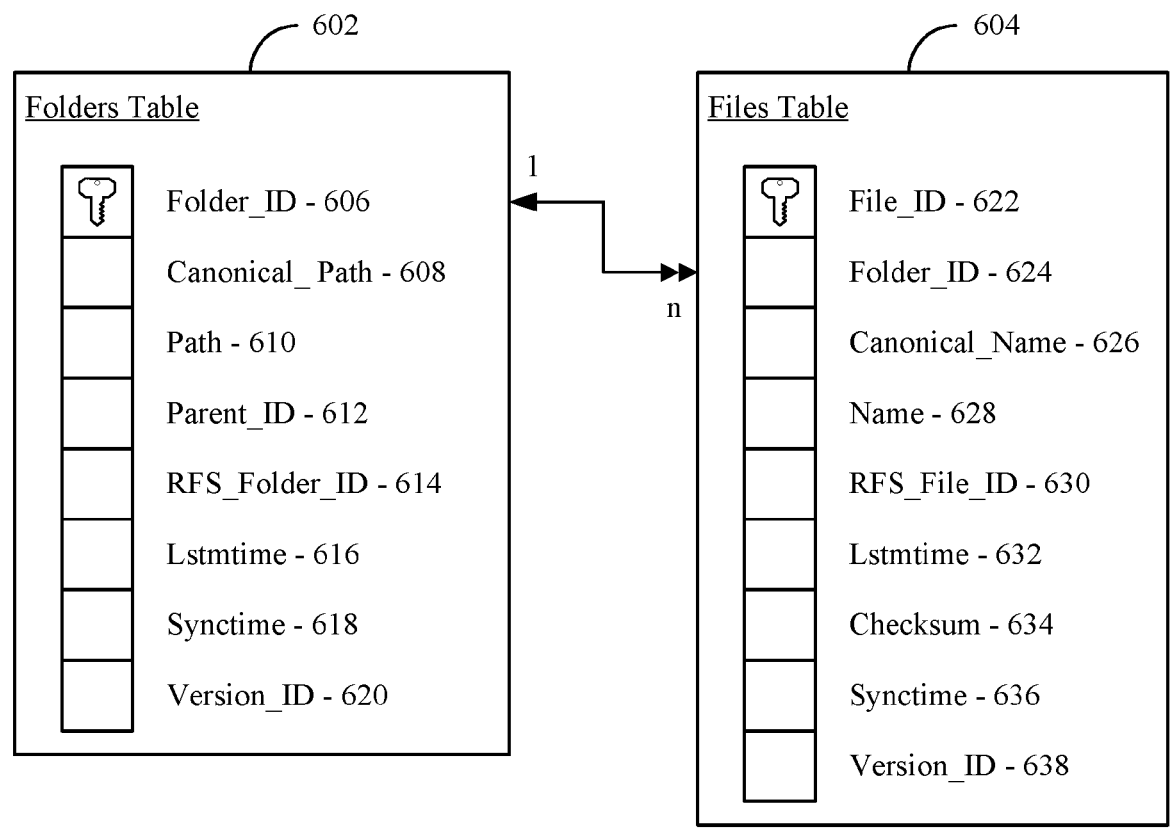
FIG. 6A is diagram showing an example data structure corresponding to metadata utilized by the elements of FIG. 5A to generate a sensitivity estimate of the corresponding data objects.

FIG. 6A is a diagram showing an example data structure 600 for the metadata stored in metadata database 504. Data structure 600 is a relational database structure that includes a folders table 602 and a files table 604. The metadata stored in metadata database 504 is utilized by sensitive content estimation service 506 to estimate the sensitivity of corresponding files.

Each record in folders table 602 corresponds to a particular folder that is stored on local file storage system 104 and includes a folder_ID field 606, which includes a unique identifier indicative of the particular associated folder. Thus, folder_ID field 606 is the key field of folders table 602. Folders table 602 also includes a canonical_path field 608, a path field 610, a parent_ID field 612, an RFS_folder_ID field 614, an lstmtime field 616, a synctime field 618, a version_ID field 620, and a prior_revision_ID field 622. Canonical-path field 608 includes a unique absolute path of the folder identified by folder_ID field 606. Path field 610 includes the local display path of the folder. Parent_ID field 612 includes the folder_ID value of the parent folder of the folder represented by the current record. RFS_folder_ID field 614 includes a unique identifier indicative of the corresponding folder on cloud-based storage 106. A null entry in RFS_folder_ID field 614 indicates that the folder has not been synchronized to cloud-based storage 106. Lstmtime field 616 includes data indicative of the last time the associated folder was modified. Synctime field 618 includes data indicative of the last time the folder was synchronized to cloud-based storage 106. A null entry in synctime field 618 indicates that the folder has not been synchronized to cloud-based storage 106. Version_ID field 620 includes data indicative of the current version of the folder.

Providing folder metadata along with the file metadata provides some advantages. One such advantage is the ability to access the entire filesystem tree, which can be utilized to make important determinations regarding specific files. For example, it is useful to know how deep within the folder tree (i.e., three folders below the root folder) a particular file resides. As another example, it is useful to know how many other files reside in the same folder.

Each record in files table 604 corresponds to a particular file that is stored on local file storage system 104 and includes a file_ID field 622, which includes a unique identifier indicative of the particular file. Thus, file_ID field 622 is the key field of files table 604. Files table 604 also includes a folder_ID field 624, a canonical_name field 626, a name field 628, an RFS_file_ID field 630, a lstmtime field 632, a checksum field 634, a synctime field 636, and a version_ID field 638. Folder_ID field 624 includes an identifier indicative of the parent folder of the particular file of the current record. Because each folder may contain many files, a single folder identifier may appear in many of the records stored in files table 604. Therefore, there is a many to one relationship between files table 604 and folders table 602. Canonical_name field 626 includes a unique absolute path including the name of the file identified by file_ID field 622. Name field 628 includes a local display name of the file. RFS_file_ID field 630 includes a unique identifier indicative of the corresponding file on cloud-based storage 106. A null entry in RFS_file_ID field 630 indicates that the file has not been synchronized to cloud-based storage 106. Lstmtime field 632 includes data indicative of the last time the associated file was modified. Checksum field 634 includes a checksum generated from the contents of the file. Synctime field 636 includes information indicative of the last time the file was synchronized to cloud-based storage 106. A null entry in synctime field 636 indicates that the file has not been synchronized to cloud-based storage 106. Version_ID field 638 includes data indicative of the current version of the file. Version_ID field 638 can also include information indicative of the number of versions of the file that exist/have existed.

Data structure 600 is exemplary and should not be construed as a necessary element of the present invention. In alternative embodiments alternate tables and fields could be used as desired. In particular, RFS_folder_ID field 614, Synctime field 618, RFS_file_ID field 630, and synctime field 636 could be omitted, especially for systems that are not synchronized to a remote cloud-based storage system. Additionally, fields can be added or removed as it is determined whether they are helpful for estimating the sensitivity of a data object. Indeed, completely different types of data structures can be used. These and other possible modifications to the structure for storing metadata will be apparent to those of ordinary skill in the art, especially in view of the foregoing disclosure.

Figure 6B:
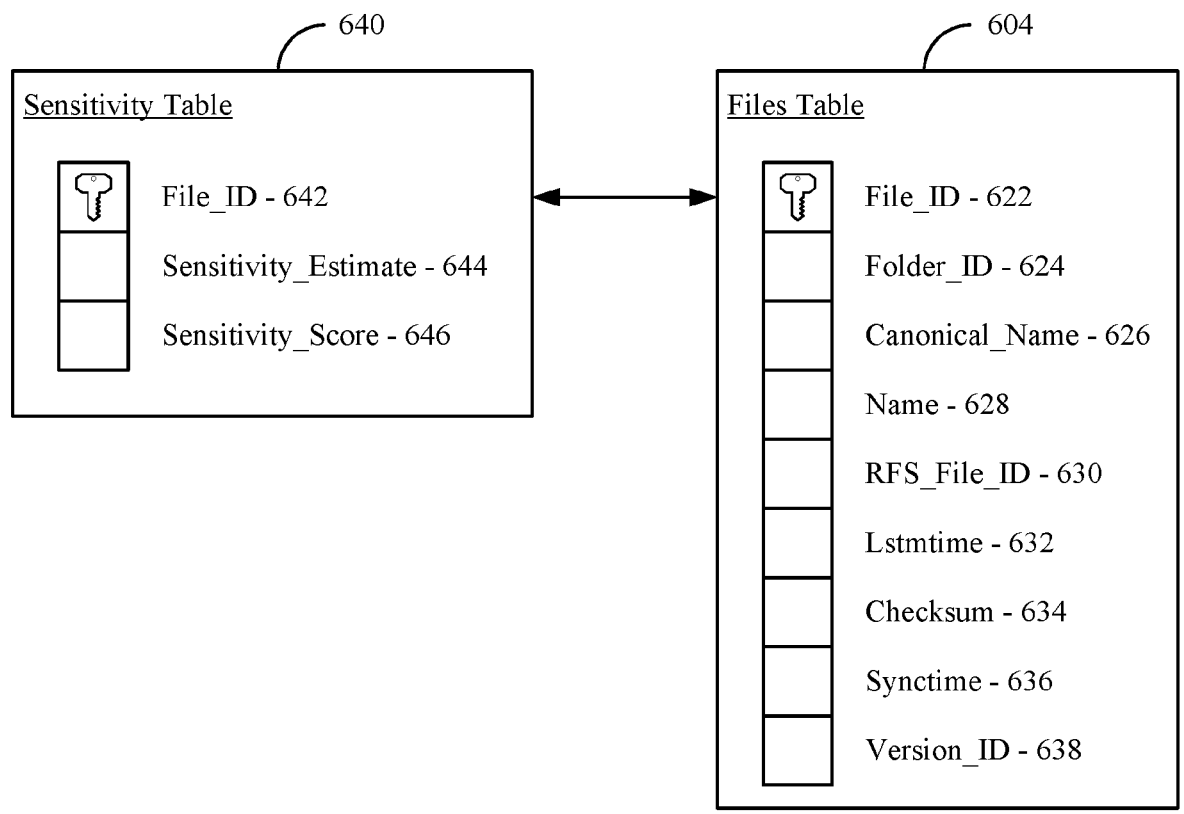
FIG. 6B is a diagram showing an additional table of the data structure of FIG. 6A for storing sensitivity estimates and sensitivity scores generated by the elements of FIG. 5A.

FIG. 6B is a diagram showing an additional sensitivity table 640 of data structure 600. For the sake of clarity, sensitivity table 640 is described as stored in sensitivity database 508, while folders table 602 and files table 604 are stored in metadata database 504. In practice, however, the tables of data structure 600 could all be stored in the same storage device or be distributed among a plurality of network-attached storage devices (e.g. multi-tenant data storage devices 402).

Sensitivity table 640 includes a file_ID field 642, a sensitivity_estimate field 644, and a sensitivity_score field 646. File_ID field 642 includes a unique identifier corresponding to a particular file, thus, file_ID field 642 is the key field of sensitivity table 640. File_ID field 642 corresponds to file_ID field 622 and records of sensitivity table 640 and files table 604 that share a common file identifier are linked (they both correspond to the same file). Therefore, records in sensitivity table 640 share a one-to-one relationship with records in files table 604.

Sensitivity_estimate field 644 includes data indicative of the sensitivity estimate generated by sensitive content estimation service 506 for the file identified by the current record. A null entry in sensitivity_estimate field 644 indicates that the file metadata has yet to be analyzed by sensitive content estimation service 506. In the example embodiment, the data in sensitivity_estimate field 644 is a number between 0 and 1 indicating the likelihood that the current file contains sensitive data. An entry of 0 in sensitivity_estimate field 644 indicates that the current file certainly does not contain sensitive data, while an entry of 1 indicates the current file certainly does contain sensitive data. In other words, the entry in sensitivity_estimate field 644 is indicative of a probability that the current file contains sensitive data. Alternative fields could include a number between 0 and 100 (e.g., a percentage) or some number normalized to a different scale (e.g., 0-10, 1-50, etc.). Another alternative field could include a score indicative of the extent of sensitive data estimated to exist within the current file and/or the relative sensitivity (e.g., somewhat sensitive data, moderately sensitive data, extremely sensitive data, etc.) of a type of sensitive data estimated to be present relative to other types of sensitive data possibly present in other files.

Sensitivity_score field 646 includes data indicative of the sensitivity score determined, based on the actual content of the file, by content classification pipeline 514 for the file identified by the current record. A null entry in sensitivity_score field 646 indicates that the file contents have yet to be analyzed by content classification pipeline 514. In the example embodiment, the data in sensitivity_score field 646 is a binary indicator identifying whether the current file includes sensitive data or not. Alternative fields could include a numeric score indicating the extent of sensitive data included in the current file, or a classification indicating that the file contains somewhat sensitive data, moderately sensitive data, extremely sensitive data, etc. Optionally, once sensitivity_score field 646 is filled, sensitivity_estimate field 644 could be altered to indicate that the file contents have already been analyzed directly, thus, removing the file from consideration by file content downloader 510. The sensitivity_score field 646 and the sensitivity_estimate field 644 can also be compared to determine the accuracy of the sensitivity estimate and/or revise the algorithms used to generate the sensitivity estimate.

Figure 7A:
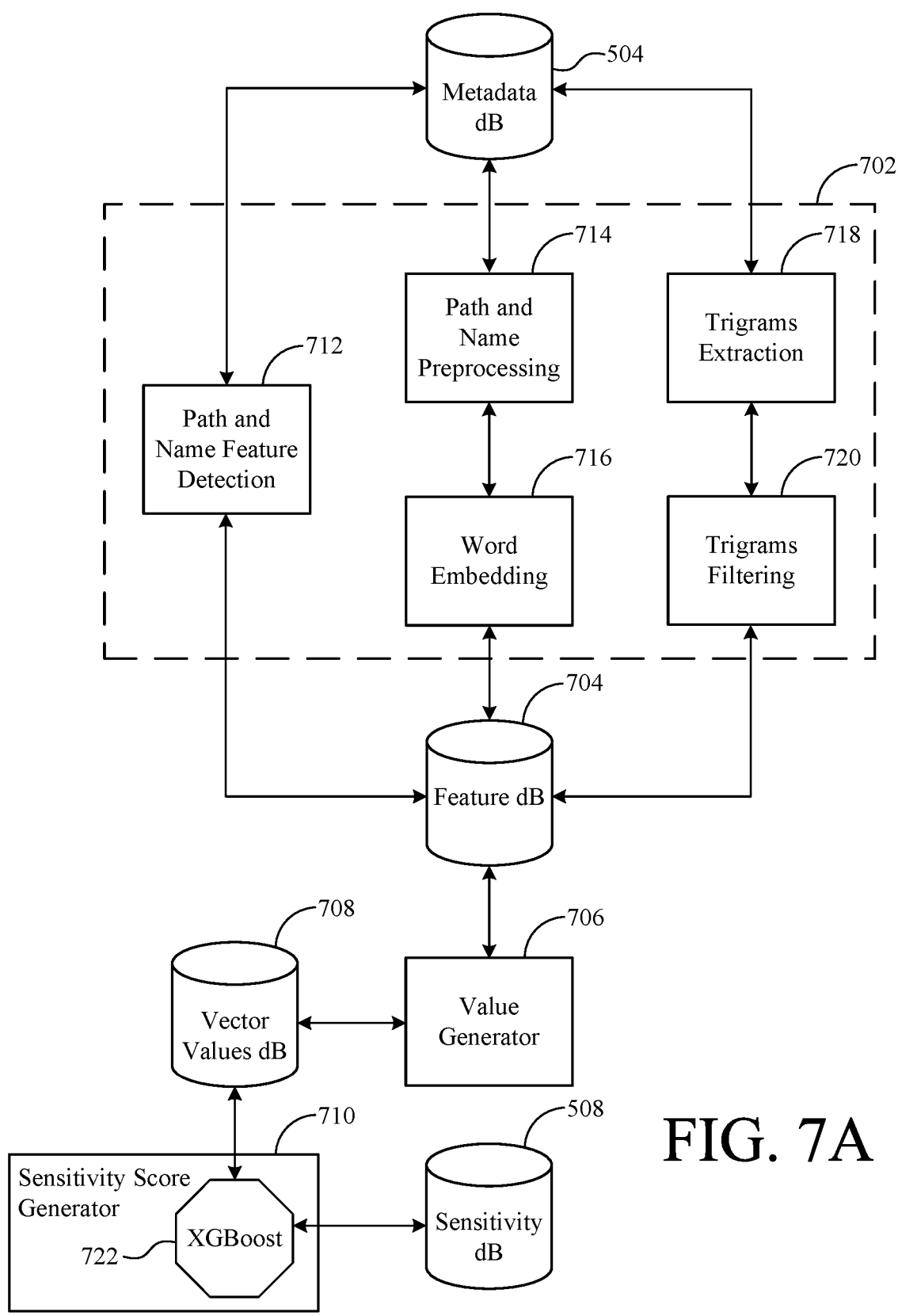
FIG. 7A is a diagram showing functional elements of the sensitive content estimation service of FIG. 5A in greater detail.

FIG. 7A is a block diagram showing sensitive content estimation service 506 in greater detail. Sensitive content estimation service 506 extracts three types of features from the metadata stored in metadata database 504, including simple analysis features, word embeddings, and trigrams. These features are expressed in a vector of values, where each element of the vector is associated with a given feature (or, optionally, a combination of features). Finally, utilizing a machine learning algorithm (e.g., XGBoost), the vector is converted into a sensitivity estimate, where the sensitivity of the file is determined based on the vector representation of the relevant features of the metadata.

A training phase includes providing the machine learning algorithm with a set of vectors and information on whether or not corresponding files contain sensitive data. The machine learning algorithm determines from these inputs which features are more likely to be indicative of sensitive content in the file. In other words, the machine learning algorithm determines a mathematical relationship between vectors and resultant sensitivity estimates, wherein a given input vector results in a corresponding output sensitivity estimate. After the training phase, the machine learning algorithm is able to generate reliable sensitivity estimates from inputted vectors without any prior indication of sensitive content within the corresponding files.

In the example embodiment, the machine learning algorithm is provided by XGBoost, which is an open-source gradient boosting framework. However, alternate algorithms are possible. One possible alternative is a support vector machine optionally utilizing Platt scaling. Other possible deviations from the example embodiment include periodic retraining. In particular, the machine learning algorithm can be periodically retrained using metadata from client files whose content has been analyzed by content classification pipeline 514. Retraining in this way will help tailor the machine learning algorithm to the data of the particular client. These alternatives are not exhaustive and will be apparent (along with additional alternatives) to those of ordinary skill in the art, especially in view of the foregoing disclosure.

For a given file, metadata is retrieved from metadata database 504 and analyzed by a set of extraction services 702 to extract relevant features. The extracted features are stored in a feature database 704. A value generator 706 accesses the features stored in feature database 704 and processes the features to generate a vector of values representative of the features (or combinations of features) of the individual file. This vector is an n-dimensional vector, in which each component of the vector is a numerical representation of a corresponding feature (or combination of features) of the metadata. The vector is stored in association with the corresponding file in a vector values database 708. A sensitivity score generator 710 retrieves the vector from vector values database 708 and analyzes it to estimate the sensitivity of the corresponding file. Finally, the sensitivity estimate is stored in sensitivity database 508 and sorted with any existing estimates to be utilized to prioritize content downloads.

Extraction services 702 include a path and name feature detection module 712, a path and name preprocessing module 714, a word embedding module 716, a trigrams extraction module 718, and a trigrams filtering module 720. Together these modules extract the relevant features from the metadata and store them within feature database 704.

Path and name feature detection module 712 performs simple analysis of the metadata of a file to identify a variety of features of the metadata that are indicative of the sensitivity of the file. These features include dates in the file name and/or path, the character lengths of the file name and/or path, the file's extension, the presence of particular symbols in the file name and/or path, the presence of numbers or capital letters in the file name and/or path, the presence of predefined words in the file name and/or path, etc. Path and name feature detection module 712 stores data indicative of the presence of these features in feature database 704 in association with the corresponding file.

Each file name and file path is checked for a year number (e.g. 1996 or 2010) or a date (e.g. 20180203). For example, the file "/Shared/Financial/2018Q2_ENMA.xlsx" contains a year, "2018" in the file name. Depending on the particular implementation, the existence of dates and years could be recorded as a single binary feature (i.e. indicating whether the name or path includes either a date or a year), as multiple binary features (i.e. indicating whether the name includes a date, whether the name includes a year, whether the path includes a date, and/or whether the path includes a year), or as a string indicating the exact date or year that appears in the path or name.

The number of characters in both the file name and the path name are also considered as features. Optionally, common prefixes, such as "/Shared/" or "/Private/", can be removed or ignored to improve the pertinence of the sensitivity scores. For example, the file "/Shared/Financial/2018Q2_EMEA.xlsx" has a length of file name equal to 16, because "2018Q2_EMEA.xlsx" contains 16 characters. Similarly, the path length is equal to 9, because "Financial" contains 9 characters. Depending on the particular implementation, the file name length and path name length could be recorded as separate numerical values and/or as a combined value.

File extensions are used as separate binary features. For example, the file "/Shared/Financial/2018Q2_EMEA.xlsx" has the feature "extension_xlsx" set to true, while the remaining features related to the file's extension (such as "extension_doc") are set to false. In the example embodiment, the file extension type is recorded in a plurality of binary records, where only one of the records associated with the extension type is set to true (or "1").

For each file, it is determined whether the name or path contains any symbols included in a predefined list of symbols, or a combination thereof. In the example embodiment the predefined list includes dots ".", underscores "_", exclamation marks "!", question marks "?", dashes "-", octothorpes (or hashes) "#", at signs "@", dollar signs "$", percent signs "%", ampersands "&", and brackets "{" and "}". In addition to identifying symbols, it is also determined whether the name or path contains letters in upper case or numbers. These features of the metadata are also recorded in binary records, where any or all of the records associated with these features could be set to true.

A domain dictionary is a customer supplied or vertical specific batch of words that may indicate sensitive content in a file. For example, the word "payroll" is identified in the file name "/Shared/HR/2016/Engineering/April 2016 payroll.xls". Path and name feature detection module 712 cross-references the name and path of the file with the domain dictionary to determine if any of the words appear therein. Depending on the particular implementation this feature can be recorded as a simple binary record, a numerical record indicating the number of sensitive words in the file or path, a numerical record indicating an overall sensitivity of the identified words, etc.

Path and name preprocessing module 714 concatenates the path and the file names, preprocesses them to replace all punctuation signs and path separators by spaces, and transforms all the characters to lowercase form. As an example, the file named "2018Q2_EMEA.xlsx" with the path name "/Shared/Financial/" is preprocessed with "shared financial 2018q2 emea xlsx" being the result. Word embedding module 716 includes a word embedding algorithm (e.g., Word2vec, fastText, etc.) that maps the set of words resulting from preprocessing of the file path and name to a vector of real numbers. The dimensionality of the vector is fixed and a parameter of the chosen word embedding algorithm. Multiple vectors generated by the word embedding algorithm will exist in similar locations of the vector space if the words have similar meanings or are used in similar contexts. The vector generated by word embedding module 712 is recorded in feature database 704 as part of the features associated with a particular file.

Trigrams extraction module 718 extracts trigrams from the path and name of a particular file. Trigrams (a special case of an n-gram) are groups of three successive symbols. For each file, the trigrams associated with the name and path are processed. Common prefixes, such as "/Shared/" or "/Private/", can be removed or ignored to improve the pertinence of the sensitivity scores. For example, the file "/Shared/Financial/2018Q2_EMEA.xlsx" contains trigrams such as "fin", "ina", and "nan". The trigrams are case-insensitive and lower-cased: "Fin" and "fin" are treated as one trigram, "fin".

Trigrams filtering module 720 filters some of the most common and least common trigrams from the extraction results. An unfiltered set of trigrams is computed for the whole training dataset, and trigrams that are the most and the least frequent in the training set are removed. This filtered set of trigrams includes all the trigrams that can be identified as features for analysis by sensitivity score generator 710. For example, a trigram can be retained as a feature if it exists for at least 3 files, and at most for 0.005*N files, where N is the number of files in the training dataset. Other frequency ranges can be utilized as needed for various applications.

The filtered trigrams are part of the features associated with a given file. In the example embodiment, the filtered trigrams extracted from each file are recorded as a comma separated list in association with the particular file in feature database 704. Alternatively, the filtered trigrams could be converted into a numerical expression, a vector, etc.

The exact list of features utilized by the present embodiment is not a necessary feature of the present invention. Indeed, the exact effect that a given feature has on the sensitivity estimate is determined by the machine-learning module and codified in the generated model. It is difficult to predict a priori how any given feature will impact the probability of a containing file including sensitive content, as the features' indications of sensitivity are not linear, not independent, and so on. Therefore, it can be beneficial in varying implementations to utilize more or fewer features and/or record the features in different ways.

Value generator 706 generates a "vector of values" based on the features extracted from the metadata. This vector is a numeric representation of the extracted features of the file. In one sense, each vector represents the location of a file within an n-dimensional vector space defined by all the possible features of the metadata. Value generator 706 stores the generated vectors in vector values database 708.

Value generator 706 accesses the stored features in feature database 704 and computes a value indicative of each particular feature for the corresponding file. The computed value comprises a component of the vector. For example, for a file with no symbols in its name or path, value generator 706 generates a "0" for the component of the vector that corresponds to the symbol feature. For a file with many symbols, value generator 706 generates a higher number. In a particular embodiment, symbols can be scored or weighted differently depending on their impact on the probability of sensitive content existing in the file. In an even more particular embodiment, these scores or weights can be slightly adjusted as a part of the training phase to better estimate the sensitivity of files. In an alternate embodiment, each symbol can be treated as a separate binary feature.

Additionally, value generator 706 can compute values indicative of combinations of features. For example, the name length and path length of a file are separate features, but could be combined as a single value with appropriate weighting between the features. For example, a file having a path length of 20 and a file name length of 10 might be combined for a value of 30. In the case of simple summation, the two features are weighted equally. However, alternative embodiments could utilize different weighting schemes, depending on the particular application.

For binary features the component of the vector relating to the particular feature can have one of two values. In the simplest embodiment, any component of the vector corresponding to a binary feature could be 1 if the feature is present or 0 if the feature is not present. Alternatively, other values could be used to represent the presence of the feature as desired. In the example embodiment, each binary feature comprises a separate component of the vector. However, like other features, multiple binary features can be combined in alternative embodiments, with appropriate weighting where desired. A value generated by such a combination can simply be equal to the number of features of the combination that are present in the metadata.

More complicated features of the metadata require different processes for generating the corresponding component of the vector. In the example embodiment, the trigrams feature and the word embedding feature are such features. In the case of the trigrams feature, the list of trigrams recorded in feature database 704 is converted into a trigram vector, where each component of the trigram vector corresponds to one of the filtered trigrams. For such a trigram vector, the value of a given component is indicative of the number of times the corresponding trigram appears in the path or name of the file. The resultant trigram vector is then additionally processed by value generator 706 and each component of the trigram vector is appended onto the vector of values as an additional component. The word embedding vector is processed by value generator 706 and added to the vector of values in similar ways. Alternatively, the trigram vector and/or the word embedding vector can be added as singular components of the vector of values. For example, a first component of the vector of values can include the magnitude of the trigrams vector, while a second component can include the magnitude of the word embedding vector.

Once value generator 706 converts the extracted features of a file into a vector of values, it stores the vector in vector values database 708 in association with the corresponding file. Vectors stored in vector values database 708 are accessed by sensitivity score generator 710 and utilized to generate an estimate of the sensitivity of the corresponding file.

Sensitivity score generator 710 includes an XGBoost algorithm 722. XGBoost algorithm 722 is an open source gradient boosting algorithm designed for use in machine learning applications. After being trained on the training phase, XGBoost algorithm 722 is able to determine the probability that a given vector of values is indicative of a file containing sensitive data. The vector of values is provided as an input to XGBoost algorithm 722 by sensitivity score generator 710, which receives the sensitivity estimate as an output from XGBoost algorithm 722. As mentioned above, the vector of values for a particular file defines a location of that file within the vector space defined by the possible features of the file's metadata. The vectors corresponding to files equally likely to contain sensitive data should be located within one or more common volumes (or hyper-volumes) of the vector space. These volumes can then be delimited (during the training phase) by XGBoost algorithm 722 in order to estimate the sensitivities of files corresponding to the vectors located within the delimited areas. Sensitivity score generator 710 then stores the sensitivity estimate in sensitivity database 508.

Figure 7B:
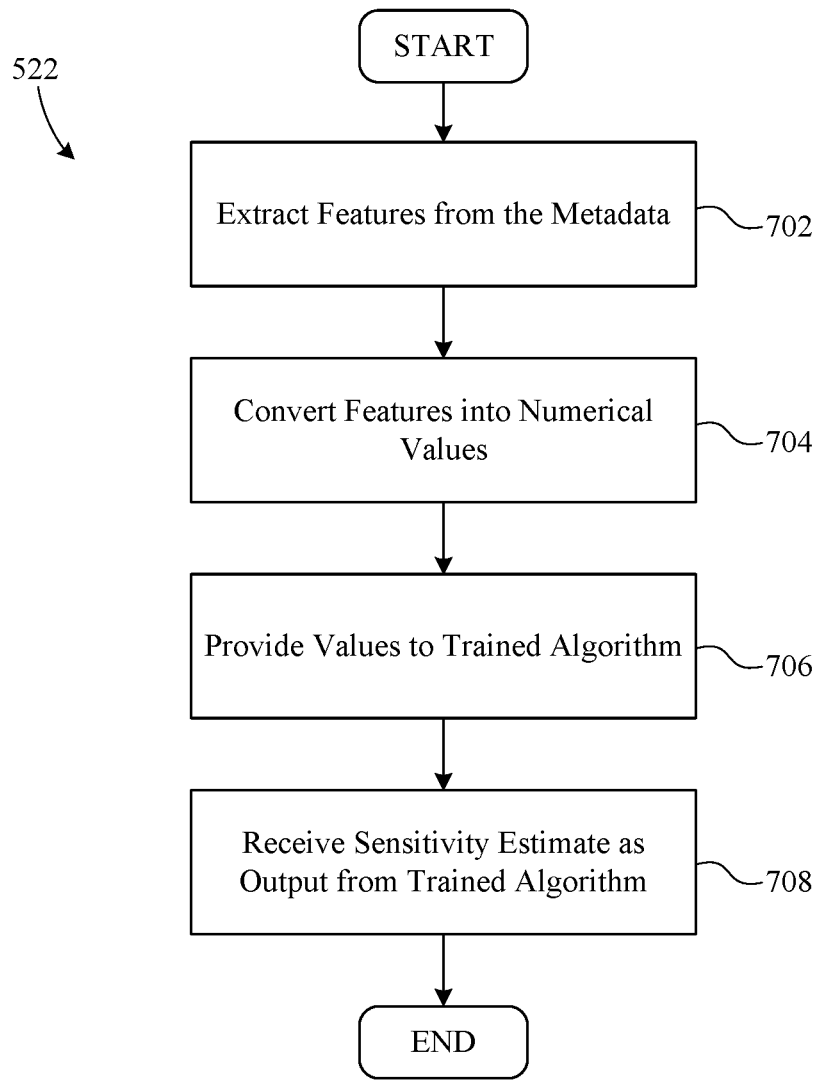
FIG. 7B is a flow chart summarizing an example method of performing a step of the method of FIG. 5A, which can be performed by elements of FIG. 7A.

FIG. 7B is a flowchart summarizing an example method for utilizing file metadata to estimate a sensitivity score for a corresponding data file, which can be performed by the elements shown in FIG. 7A. The example method of FIG. 7B is a particular example of step 522 of method 516 (shown in FIG. 5B). In a first step 702, extraction services 702 extract features from the metadata. Then, in a second step 704, value generator 706 converts the extracted features into numerical values. Next, in a third step 706, the values are provided to trained XGBoost algorithm 722. Finally, in a fourth step 708, the sensitivity estimate is received by sensitivity score generator 710 as output from XGBoost algorithm 722. It should be noted that, although step 522 is described with reference to the elements of FIG. 7A, these particular elements are not necessary for carrying out step 522.

Figure 8:
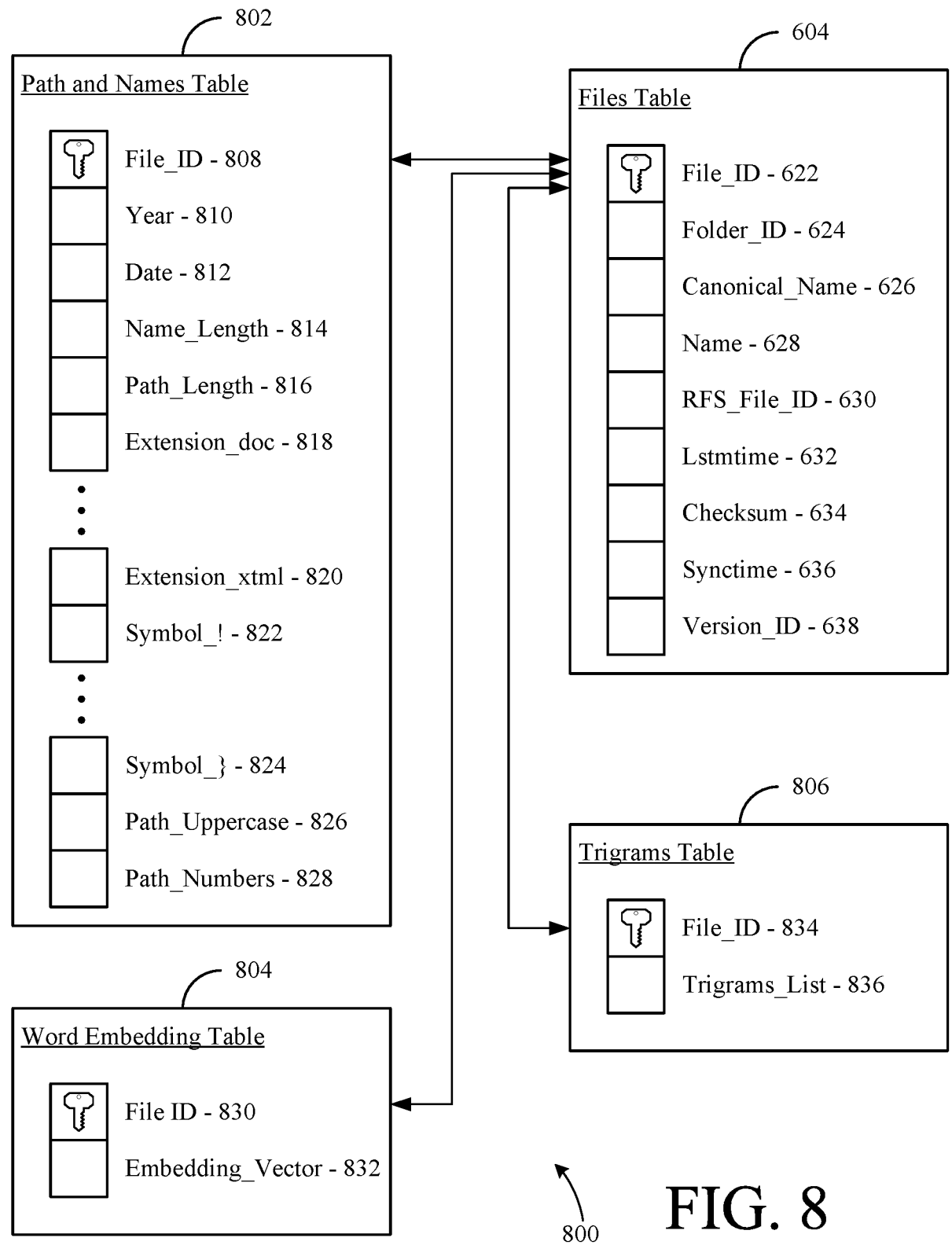
FIG. 8 is a diagram showing an example data structure for storing features extracted from metadata by elements of FIG. 7A.

FIG. 8 illustrates an example data structure 800 for data stored in feature database 704. Data structure 800 is a relational database; however, other data structures could be substituted for data structure 800. Other suitable data structures include graphs, tables, lists, etc. Data structure 800 includes files table 604, a path and names table 802, a word embedding table 804, and a trigrams table 806. Files table 604 is described in detail with reference to FIG. 6A above.

Path and names table 802 includes a file_ID field 808, a year field 810, a date field 812, a name_length field 814, a path_length field 816, an extension_doc field 818, an extension_xtml field 820, a symbol_! field 822, a symbol_} field 824, a path_uppercase field 826, and a path_numbers field 828. File_ID field 808 includes a unique identifier indicative of a particular file. Thus, file_ID field 808 is the key field of path and names table 802. File_ID field 808 corresponds to file_ID field 622 of files table 604 and links records in each table that correspond to the same file. There is a one to one relationship between records in files table 604 and path and names table 802.

The rest of the fields of path and names table 802 include entries corresponding to features extracted from the corresponding file's metadata. Year field 810 includes a binary value indicating whether the path or name of the file includes a year. Data field 812 includes a binary value indicating whether the path or name of the file includes a data. Name_length field 814 includes a value indicative of the length of the name of the file. Path_length field 816 includes a value indicative of the length of the path of the file. Extension_doc field 818 includes a binary value indicating whether or not the extension of the file is ".doc". Extension_xtml field 820 includes a binary value indicating whether or not the extension of the file is ".xtml". A plurality of additional fields between extension_doc field 818 and extension_xtml field 820 corresponding to additional file extension types can also be included in path and names table 802. Symbol_! field 822 includes a binary value indicating whether or not the name or path of the file includes the symbol "!". Symbol_} field 824 includes a binary value indicating whether or not the name or path of the file includes the symbol "}". A plurality of additional fields between symbol_! field 822 and symbol_} field 824 corresponding to additional symbols can also be included in path and names table 802. Path_uppercase field 826 includes a binary value indicating whether or not the file path and/or name includes uppercase letters. Path_numbers field 828 includes a binary value indicating whether or not the file path and/or name includes numbers. The information stored in path and names table 802 is recorded by path and name feature detection module 712, based at least in part on the information stored in files table 604.

Word embedding table 804 includes a file_ID field 830 and an embedding_vector field 832. File_ID field 830 includes a unique identifier indicative of a particular file. Thus, file_ID field 830 is the key field of word embedding table 804. File_ID field 830 corresponds to file_ID field 622 of files table 604 and links records in each table that correspond to the same file. There is a one to one relationship between records in files table 604 and word embedding table 804. Embedding_vector field 832 includes a comma separated list of values indicative of the word-embedding vector generated by word embedding module 716. The information stored in word embedding table 804 is recorded by word embedding module 716, based at least in part on the information stored in files table 604.

Trigrams table 806 includes a file_ID field 834 and a trigrams_list field 836. File_ID field 834 includes a unique identifier indicative of a particular file. Thus, file_ID field 834 is the key field of trigrams table 806. File_ID field 834 corresponds to file_ID field 622 and links records in each table that correspond to the same file. There is a one to one relationship between records in files table 604 and trigrams table 806. Trigrams_list field 836 includes a comma separated list of trigrams extracted by trigrams extracted module 718 and filtered by trigrams filtering module 720. The information stored in trigrams table 806 is recorded by trigrams filtering module 720, based at least in part on the information stored in files table 604.

The exact structure and type data stored in the tables is not essential to the invention. Indeed, the data stored in each of the tables can be customized for a variety of purposes. For example, an enterprise organization could customize the data stored in the tables in order to provide a more accurate indicator of the sensitivity of their own files, based on internal knowledge of their own unique data. As another example, the data could be customized to provide the most accurate sensitivity estimates for a wide range of organization types or for use with a wide range of models, algorithms, etc.

Figure 9:
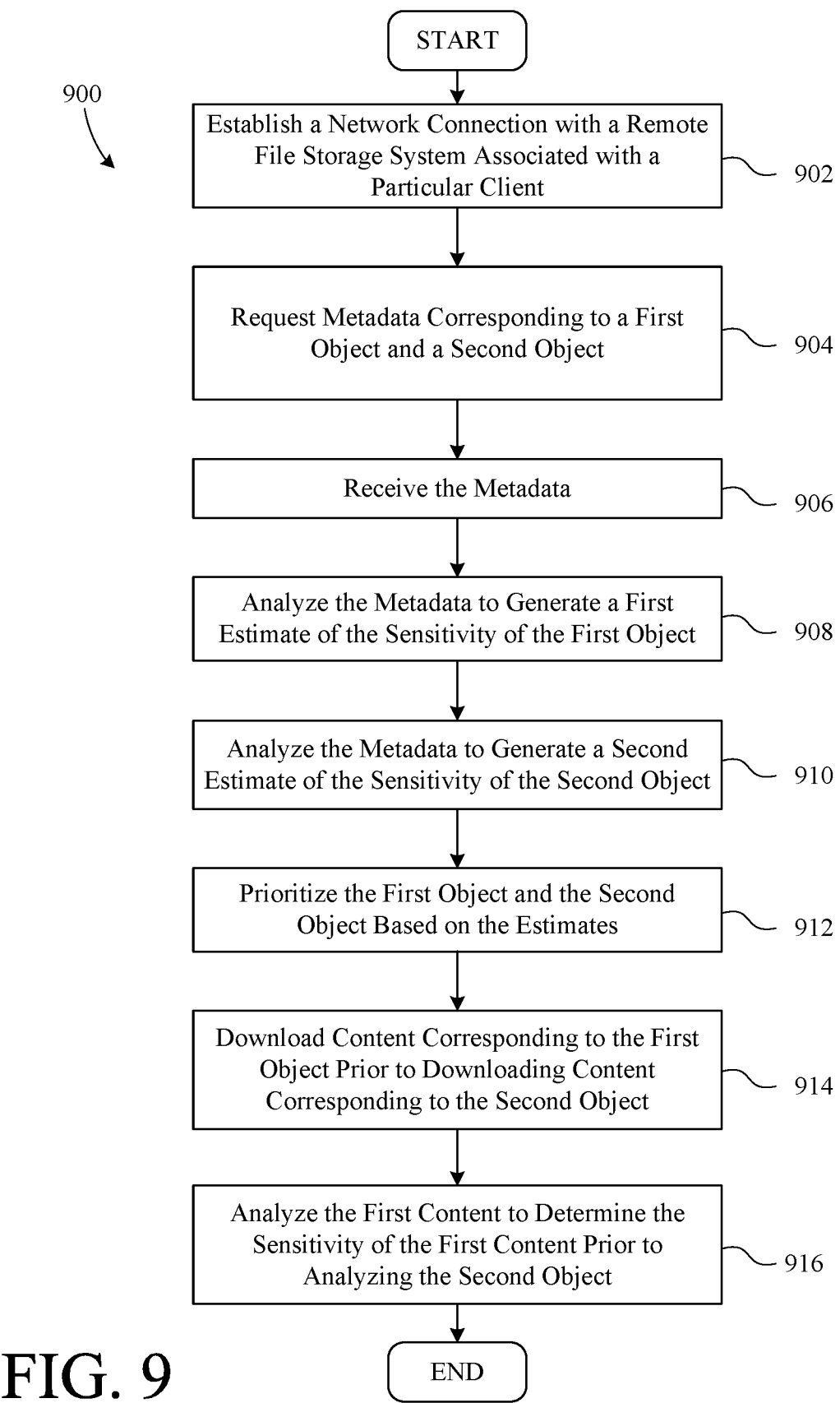
FIG. 9 is a flowchart summarizing an example method of prioritizing file system content for sensitive content analysis.

FIG. 9 is a flowchart summarizing an example method 900 for determining the sensitivity of files stored on a remote file storage system. In a first step 902, a network connection (e.g., a wide-area network connection) is established with the remote file storage system associated with a particular client. In the example embodiment, the particular client is one of a plurality of cloud customers, but the invention is not necessarily limited to subscriber-based cloud computing systems. In a second step 904, metadata corresponding to a first object and a second object is requested. Then, in a fourth step 908, the metadata is analyzed to generate a first estimate of the sensitivity of the first object. Similarly, in a fifth step 910, the metadata is analyzed to generate a second estimate of the sensitivity of the second object. Then, in a sixth step 912, the first object and the second object are prioritized based at least in part on the first and second estimates. Next, in a seventh step 914, content corresponding to the first object is downloaded prior to downloading content corresponding to the second object, based at least in part on the prioritization. Finally, in an eighth step 916, the content corresponding to the first object is analyzed prior to analyzing the content corresponding to the second object, based at least in part on the prioritization.

The description of particular embodiments of the present invention is now complete. Many of the described features may be substituted, altered or omitted without departing from the scope of the invention. For example, referring again to FIGS. 1, 3, and 4, some of data governance services 416 can be pushed from data governance server 406(1) to governance interface services 312 of governance interface host device 206. In this case, the analysis of the metadata and generation of the file sensitivity estimates can be performed at client sites 118, thereby eliminating the need to transfer the metadata to cloud-based data governance system 102. The estimates would still be used to prioritize the transfer of the files (object/content) from local file storage system 104 to cloud-based data governance system 102. Furthermore, the advantages of estimating sensitivity and prioritizing sensitivity analysis of content based on the estimates are significant even for completely local data governance. Therefore, all of data governance services 416 can be implemented on client site 118 if desired.

As other examples of variations, alternate hardware (e.g., processing devices, storage devices, etc.), may be substituted for the hardware shown. Furthermore, software processes can be altered by the addition, omission, alteration, etc. of processing steps. These processes may also be altered to generate and/or utilize different types of data. These and other deviations from the particular embodiments shown will be apparent to those skilled in the art, particularly in view of the foregoing disclosure.

We claim:

1. In a data governance system, a method for performing sensitive content analysis on a plurality of file system objects of a geographically remote file storage system associated with a particular client, said method comprising:

establishing a wide-area network connection with said remote file storage system;

receiving, via said wide-area network connection, first metadata and second metadata, said first metadata corresponding to at least a first object of said plurality of file system objects of said remote file storage system, and said second metadata corresponding to at least a second object of said plurality of file system objects of said remote file storage system;

analyzing said first metadata to generate a first estimate value based at least in part on said first metadata, said first estimate value being indicative of a likelihood that said first object includes sensitive content;

analyzing said second metadata to generate a second estimate value based at least in part on said second metadata, said second estimate value being indicative of a likelihood that said second object includes sensitive content;

prioritizing said first object and said second object, based at least in part on said first estimate value and said second estimate value;

retrieving said first object prior to retrieving said second object based at least in part on results of said prioritizing;

analyzing first content of said first object to determine whether said first object includes sensitive content prior to analyzing second content of said second object to determine whether said second object includes sensitive content;

obtaining a first set of training metadata corresponding to a first set of file system objects, each object of said first set of file system objects having a known sensitivity corresponding to an amount of sensitive data known to be present in each respective file system object;

processing said first set of training metadata to extract a first set of training features from said first set of training metadata; and analyzing said first set of training features to determine a relationship between said first set of training features and said known sensitivities of said first set of file system objects; and wherein said step of analyzing said first metadata includes extracting a first set of features from said first metadata, said first set of features having been determined to be indicative of said likelihood that said first object includes sensitive content;

said step of analyzing said first metadata includes analyzing said first set of features of said first metadata to generate said first estimate value;

said step of analyzing said second metadata includes extracting a second set of features from said second metadata, said second set of features having been determined to be indicative of said likelihood that said second object includes sensitive content;

said step of analyzing said second metadata includes analyzing said second set of features of said second metadata to generate said second estimate value;

said step of analyzing said first set of features includes utilizing said relationship between said first set of training features and said known sensitivities to generate said first estimate value;

said step of analyzing said second set of features includes utilizing said relationship between said first set of training features and said known sensitivities to generate said second estimate value;

said step of extracting said first set of features from said first metadata includes representing said features as a first set of values, each value of said first set of values being indicative of one or more of said features extracted from said metadata;

said step of processing said first set of training metadata includes representing said first set of training features as a first set of training values, each training value of said first set of training values being indicative of one or more of said training features of said first set of training features, said step of analyzing said first set of training features includes analyzing said first set of training values to determine said relationship; and said step of analyzing said first set of features of said first metadata includes analyzing said first set of values in view of said relationship.

2. The method of claim 1, wherein:

said first set of features includes a first name and a first path of said first object; and said second set of features includes a second name and a second path of said second object.

3. The method of claim 1, wherein:

said step of analyzing said first metadata includes generating said first estimate value as a particular value within a range of possible values, a first extreme of said range of possible values indicating that said first object definitely contains sensitive information and a second extreme of said range of possible values indicating that said first object definitely does not contain sensitive information; and said step of prioritizing said first object and said second object includes prioritizing said first object above said second object, when said first estimate value is nearer said first extreme than said second estimate value.

4. The method of claim 1, wherein said step of extracting said first set of features from said first metadata includes determining a number of characters included in a first name or a first path of said first object.

5. The method of claim 1, wherein said step of extracting said first set of features from said first metadata includes determining whether a first name or a first path of said first object contains a year or a date.

6. The method of claim 1, wherein said step of extracting said first set of features from said first metadata includes determining whether any of a predefined list of non-alphanumeric symbols are included in a first name or a first path of said first object.

7. A data governance system for performing sensitive content analysis on a plurality of file system objects of a geographically remote file storage system associated with a particular client, said system comprising:

at least one hardware processor;

memory storing data and code, said code including a set of predefined instructions configured to cause said hardware processor to perform a corresponding set of operations when executed by said hardware processor;

a network interface electrically connected to establish a wide-area network connection with said remote file storage system;

a metadata service including
- a first subset of said set of predefined instructions configured to receive, via said wide-area network connection, first metadata and second metadata, said first metadata corresponding to at least a first object of said plurality file system objects of said remote file storage system, and said second metadata corresponding to at least a second object of said plurality of file system objects of said remote file storage system;

a sensitive content prediction service including
- a second subset of said set of predefined instructions configured to analyze said first metadata to generate a first estimate value based at least in part on said first metadata, said first estimate value being indicative of a likelihood that said first object includes sensitive content, and to analyze said second metadata to generate a second estimate value based at least in part on said second metadata, said second estimate value being indicative of a likelihood that said second object includes sensitive content, and
- a third subset of said set of predefined instructions configured to prioritize said first object and said second object, based at least in part on said first estimate and said second estimate;

a content service including a fourth subset of said set of predefined instructions configured to retrieve said first object prior to retrieving said second object based at least in part on said prioritization; and a content classification service including a fifth subset of said set of predefined instructions configured to analyze first content of said first object to determine whether said first object includes sensitive content prior to analyzing second content of said second object to determine whether said second object includes sensitive content;

a training service including
- a sixth subset of said set of predefined instructions configured to obtain a first set of training metadata corresponding to a first set of file system objects, each object of said first set of file system objects having a known sensitivity corresponding to an amount of sensitive data known to be present in each respective file system object,
- a seventh subset of said set of predefined instructions configured to process said first set of training metadata to extract a first set of training features from said first set of training metadata, and
- an eighth subset of said set of predefined instructions configured to analyze said first set of training features to determine a relationship between said first set of training features and said known sensitivities of said first set of file system objects; and wherein said second subset of said set of predefined instructions is additionally configured to utilize said relationship between said first set of training features and said known sensitivities to generate said first estimate value;

said second subset of said set of predefined instructions is further configured to utilize said relationship between said first set of training features and said known sensitivities to generate said second estimate value;

said second subset of said set of predefined instructions is additionally configured to extract a first set of features from said first metadata, said first set of features having been determined to be indicative of said likelihood that said first object includes sensitive content;

said second subset of said set of predefined instructions is further configured to analyze said first set of features of said first metadata to generate said first estimate value;

said second subset of said set of predefined instructions is further configured to extract a second set of features from said second metadata, said second set of features having been determined to be indicative of said likelihood that said second object includes sensitive content;

said second subset of said set of predefined instructions is further configured to analyze said second set of features of said second metadata to generate said second estimate value;

extracting a first set of features from said first metadata includes representing said features as a first set of values, each value of said first set of values being indicative of one or more of said features extracted from said first metadata;

processing said first set of training metadata includes representing said first set of training features as a first set of training values, each training value of said first set of training values being indicative of one or more of said training features of said first set of training features;

analyzing said first set of training features includes analyzing said first set of training values to determine said relationship; and analyzing said first set of features of said first metadata includes analyzing said first set of values in view of said relationship.

8. The data governance system of claim 7, wherein:
said first set of features includes a first path and a first name of said first object; and
said second set of features includes a second path and a second name of said second object.

9. The system of claim 7, wherein said second subset of said set of predefined instructions is further configured to determine a number of characters included in a first name or a first path of said first object.

10. The system of claim 7, wherein said second subset of said set of predefined instructions is further configured to determine whether a first name or a first path of said first object contains a year or a date.

11. The system of claim 7, wherein said second subset of said set of predefined instructions is further configured to determine a file extension type of said first object.

12. The system of claim 7, wherein said second subset of said set of predefined instructions is further configured to determine whether any of a predefined list of non-alphanumeric symbols are included in a first name or a first path of said first object.

13. The system of claim 7, wherein said second subset of said set of predefined instructions is further configured to determine whether any of a predefined list of words indicative of sensitive content are included in said metadata corresponding to said first object.

14. The system of claim 7, wherein said second subset of said set of predefined instructions is further configured to:
process said first metadata to extract n-grams from a name or a pathway of said first object, said n-grams each including a predetermined number (n) of consecutive characters from said first name or said first path, said predetermined number being the same for each of said n-grams;

filter said n-grams to remove a first portion of said n-grams that occur most frequently within said metadata; and filter said n-grams to remove a second portion of said n-grams that occur least frequently within said metadata.

15. The system of claim 14, wherein said predetermined number is three.

16. The system of claim 7, wherein:

said second subset of said set of predefined instructions is additionally configured to generate said first estimate value as a particular value within a range of possible values, a first extreme of said range of possible values indicating said first object definitely contains sensitive information and a second extreme of said range of possible values indicating said first object definitely does not contain sensitive information; and said third subset of said set of predefined instructions is additionally configured to prioritize said first object above said second object, when said first estimate value is nearer said first extreme than said second estimate value.

17. A data governance system for performing sensitive content analysis on a plurality of file system objects of a geographically remote file storage system associated with a particular client, said system comprising:

at least one hardware processor;

memory storing data and code, said code including a set of predefined instructions configured to cause said hardware processor to perform a corresponding set of operations when executed by said hardware processor;

a network interface electrically connected to establish a wide-area network connection with said remote file storage system;

a metadata service including a first subset of said set of predefined instructions configured to receive, via said wide-area network connection, first metadata and second metadata, said first metadata corresponding to at least a first object of said plurality file system objects of said remote file storage system, and said second metadata corresponding to at least a second object of said plurality of file system objects of said remote file storage system;

a sensitive content prediction service including a second subset of said set of predefined instructions configured to analyze said first metadata to generate a first estimate value based at least in part on said first metadata, said first estimate value being indicative of a likelihood that said first object includes sensitive content, and to analyze said second metadata to generate a second estimate value based at least in part on said second metadata, said second estimate value being indicative of a likelihood that said second object includes sensitive content, and a third subset of said set of predefined instructions configured to prioritize said first object and said second object, based at least in part on said first estimate and said second estimate;

a content service including a fourth subset of said set of predefined instructions configured to retrieve said first object prior to retrieving said second object based at least in part on said prioritization; and a content classification service including a fifth subset of said set of predefined instructions configured to analyze first content of said first object to determine whether said first object includes sensitive content prior to analyzing second content of said second object to determine whether said second object includes sensitive content; and wherein said second subset of said set of predefined instructions is additionally configured to extract a first set of features from said first metadata, said first set of features having been determined to be indicative of said likelihood that said first object includes sensitive content;

said second subset of said set of predefined instructions is further configured to analyze said first set of features of said first metadata to generate said first estimate value;

said second subset of said set of predefined instructions is further configured to extract a second set of features from said second metadata, said second set of features having been determined to be indicative of said likelihood that said second object includes sensitive content;

said second subset of said set of predefined instructions is further configured to analyze said second set of features of said second metadata to generate said second estimate value;

said second subset of said set of predefined instructions is further configured to process said first metadata to extract n-grams from a name or a pathway of said first object, said n-grams each including a predetermined number (n) of consecutive characters from said first name or said first path, said predetermined number being the same for each of said n-grams;

said second subset of said set of predefined instructions is further configured to filter said n-grams to remove a first portion of said n-grams that occur most frequently within said metadata; and said second subset of said set of predefined instructions is further configured to filter said n-grams to remove a second portion of said n-grams that occur least frequently within said metadata.

18. The system of claim 17, wherein said second subset of said set of predefined instructions is further configured to determine a file extension type of said first object.

19. The system of claim 17, wherein said second subset of said set of predefined instructions is further configured to determine whether any of a predefined list of words indicative of sensitive content are included in said metadata corresponding to said first object.

20. The system of claim 17, wherein said predetermined number is three.

* * * * *